United States Patent [19]
Tanaka

[11] Patent Number: 5,899,985
[45] Date of Patent: May 4, 1999

[54] INFERENCE METHOD AND INFERENCE SYSTEM

[75] Inventor: Toshikazu Tanaka, Toda, Japan

[73] Assignee: Kabushiki Kaisha Toshiba, Kawasaki, Japan

[21] Appl. No.: 08/523,617

[22] Filed: Sep. 5, 1995

[30]     Foreign Application Priority Data

Sep. 5, 1994  [JP]  Japan ................................. 6-211034

[51] Int. Cl.⁶ ............................................. G06F 15/18
[52] U.S. Cl. .............................................. 706/45; 706/54
[58] Field of Search ................................. 706/45, 54, 46, 706/53

[56]              References Cited

U.S. PATENT DOCUMENTS

| | | | |
|---|---|---|---|
| 5,243,689 | 9/1993 | Yoshiura et al. | 706/12 |
| 5,267,348 | 11/1993 | Someya et al. | 706/52 |
| 5,317,667 | 5/1994 | Dolan et al. | 706/10 |
| 5,398,304 | 3/1995 | Bauman et al. | 706/49 |
| 5,402,524 | 3/1995 | Bauman et al. | 706/45 |
| 5,581,664 | 12/1996 | Allen et al. | 706/46 |
| 5,586,218 | 12/1996 | Allen | 706/12 |
| 5,715,374 | 2/1998 | Heckerman et al. | 706/46 |

OTHER PUBLICATIONS

Nitta et al., "Helic–II: A Legal Reasoning System on the Parallel Inference Machine," Proceedings of the International Conference on Fifth Generation Computer Systems, 1992, pp. 1115–1124.

Yasunobu et al., "An Intergrating Method for Rule–based Reasoning and Case–based Reasoning," Journal of Japanese Society of AI, vol. 7, No. 6, 1992, pp. 155–162.

Nakatani et al., "Tuning Rules by Cases," Topics in Case–Based Reasoning: Procs. First European CBR Workshop, Lecture Notes in AI 837, 1993, pp. 313–324.

Nitta, "Legal Reasoning System Helic–II," Institute for New Generation Computer Technology, Jul. 1992, pp. 603–607.

*Primary Examiner*—Robert W. Downs
*Assistant Examiner*—Sanjiv Shah
*Attorney, Agent, or Firm*—Oblon, Spivak, McClelland, Maier & Neustadt, P.C.

[57]              ABSTRACT

It is an object of this invention to provide a high-accuracy inference method and an inference system. The input reads fact data into this system. Fact data is stored in a work area, and the inference is started. The inference cycle of the inference is as follows. First, the rule extraction processing module compares rules with data to extract an optimum rule. Then, the case extraction processing module extracts from the case storing a case which matches the extracted rule. Then, the selection processing module compares the condition of the extracted rule with that of the extracted case, and selects one of them which is more similar to the fact data. The execution processing module executes the procedure of the selected rule or case. The inference cycle is repeated unless the executed procedure stops processing.

14 Claims, 22 Drawing Sheets

FIG. 3

| CASE IDENTIFIER | INFERENCE CONTEXT | FLUID TEMPERATURE | FLUID PRESSURE | PIPE SIZE | VALVE MATERIAL |
|---|---|---|---|---|---|
| C1 | VALVE SELECTION | 8.5 | 7.5 | 90 | SPECIAL TITANIUM |
| C2 | VALVE SELECTION | 7.0 | 3.0 | 90 | TITANIUM |

EXAMPLE OF CASE BASE CONTENTS

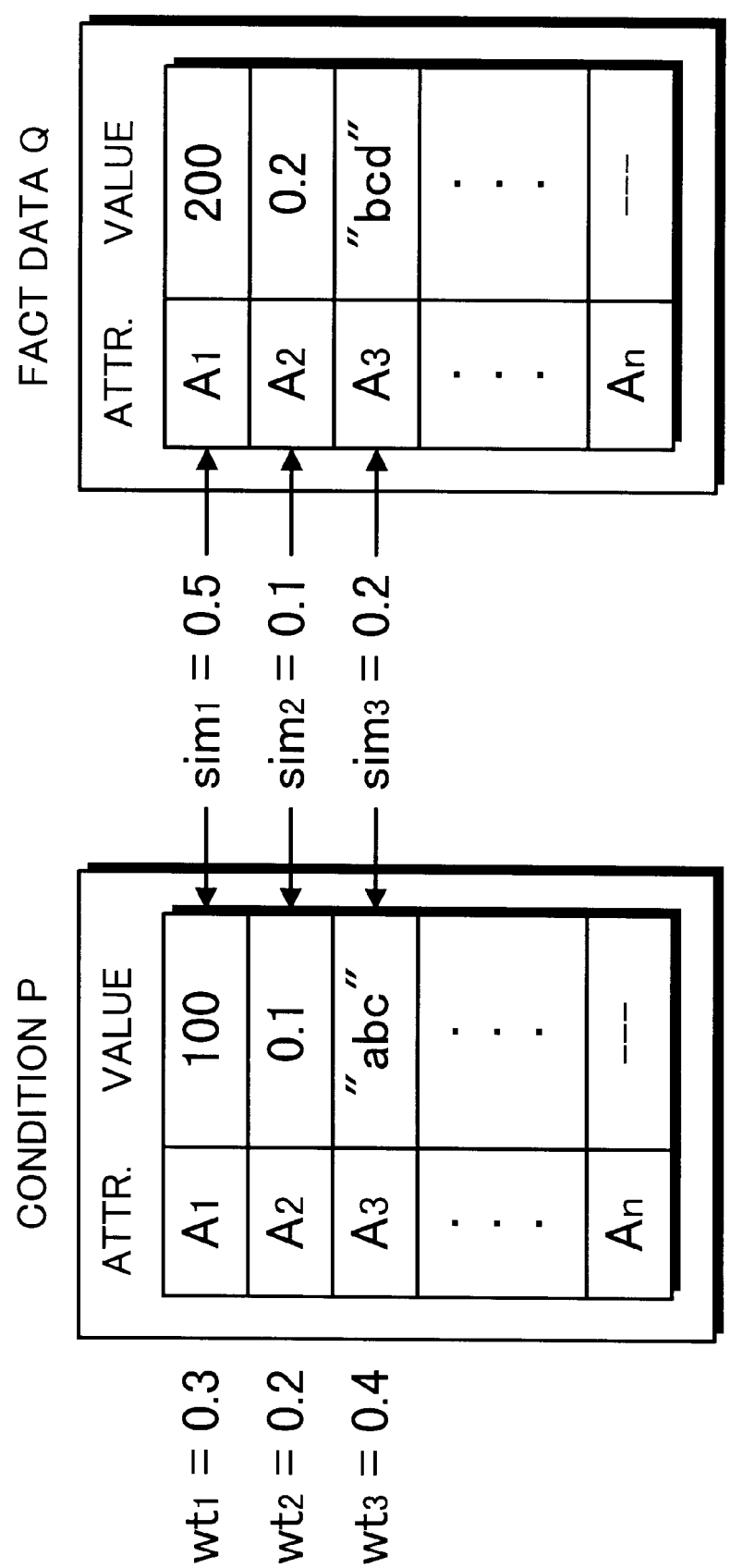

FIG. 6 (a)

| ATTRIBUTE | SIMILARITY EVALUATION KNOWLEDGE FOR THE ATTRIBUTE (SIM) |
|---|---|
| FLUID TEMPERATURE | $\lvert T_1 - T_2 \rvert$ |
| FLUID PRESSURE | $\lvert P_1 - P_2 \rvert$ |

SIMILARITY EVALUATION KNOWLEDGE
FOR THE ATTRIBUTE

FIG. 6 (b)

| RULE | ATTRIBUTE IMPORTANCE DEGREE (FLUID TEMPERATURE : FLUID PRESSURE) | NEIGHBORHOOD THRESHOLD |
|---|---|---|
| A | 1 : 1 | 0.5 |
| B | 1 : 1 | 1.0 |
| C | 1 : 1 | 1.4 |

ATTRIBUTE IMPORTANCE DEGREE
AND NEIGHBORHOOD THRESHOLD

SIMILARITY EVALUATION KNOWLEDGE

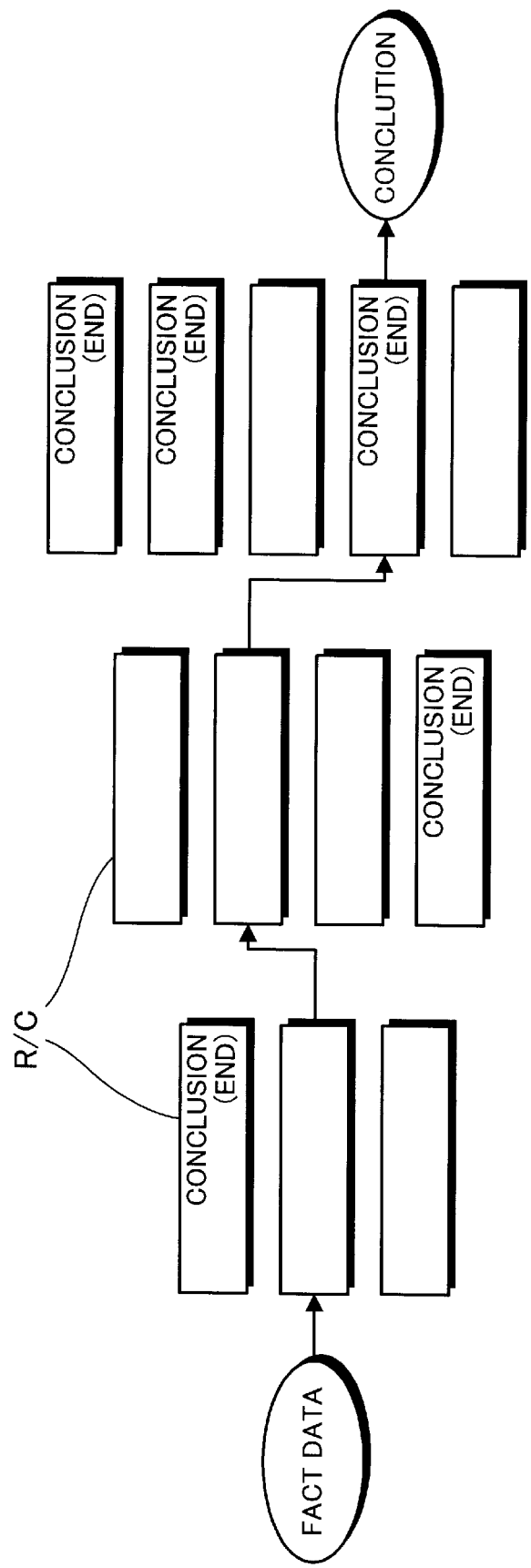

RULE AND CASE SELECTION CRITERIA
(WHEN THERE IS NO CONFLICT NEGATIVE CASE)

RULE AND CASE SELECTION CRITERIA
(WHEN THERE IS A CONFLICT NEGATIVE CASE)

FIG. 10
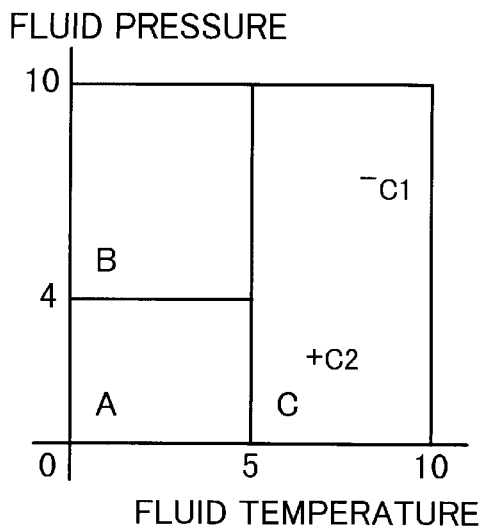
(a)
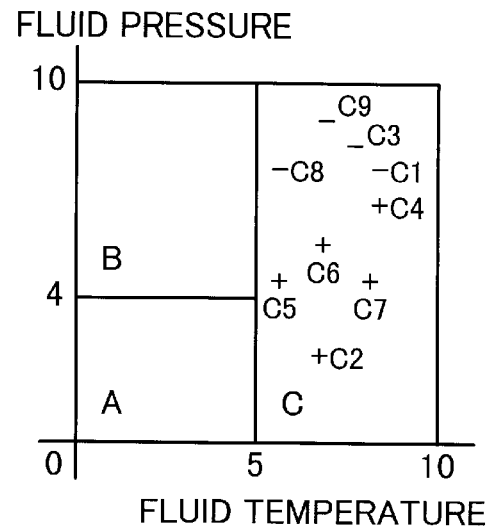
(b)
CASE BASE EXTENSION PROCESS
FIG. 12
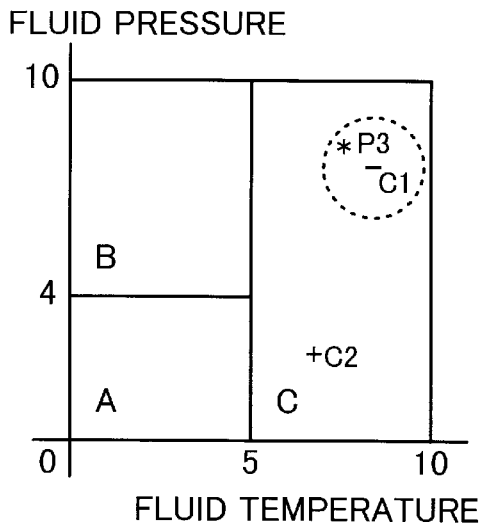
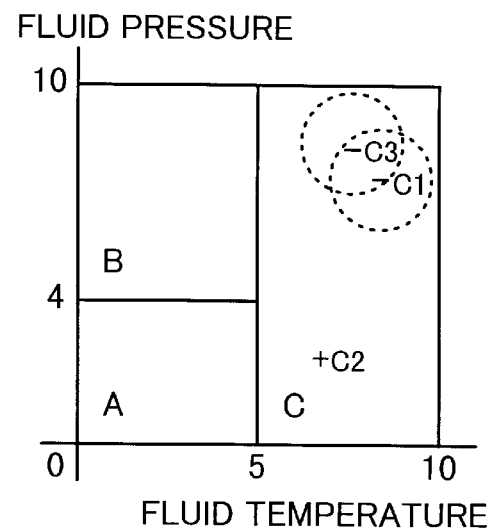
INFERENCE AND CASE ADDITION WHEN PROBLEM P3 IS GIVEN

FIG. 11

| CASE IDENTIFIER | INFERENCE CONTEXT | FLUID TEMPERATURE | FLUID PRESSURE | PIPE SIZE | VALVE MATERIAL |
|---|---|---|---|---|---|
| P3 | VALVE SELECTION | 8.0 | 8.0 | 90 | (UNKNOWN) |
| P4 | VALVE SELECTION | 8.5 | 6.5 | 90 | (UNKNOWN) |
| P5 | VALVE SELECTION | 6.0 | 5.0 | 90 | (UNKNOWN) |
| P6 | VALVE SELECTION | 7.0 | 6.0 | 90 | (UNKNOWN) |
| P7 | VALVE SELECTION | 8.0 | 5.0 | 90 | (UNKNOWN) |
| P8 | VALVE SELECTION | 6.0 | 7.5 | 90 | (UNKNOWN) |
| P9 | VALVE SELECTION | 7.0 | 9.0 | 90 | (UNKNOWN) |

EXAMPLE OF A PROBLEM

INFERENCE AND CASE ADDITION WHEN PROBLEM P4 IS GIVEN

INFERENCE AND CASE ADDITION
WHEN PROBLEMS P5, P6 AND P7 ARE GIVEN

INFERENCE AND CASE ADDITION WHEN PROBLEM P8 IS GIVEN

INFERENCE AND CASE ADDITION WHEN PROBLEM P9 IS GIVEN

SIMILARITY KNOWLEDGE TUNING

FIG. 18

```
rule A {
            ( inference      context     valve selection )
            ( fluid          temperature  <= 5
                             pressure     <= 4           )
            ( pipe           size         <= 100         )
    →
            modify ( 1       context     valve selection completed )
            make ( valve     material    aluminum )
}
rule B {
            ( inference      context     valve selection )
            ( fluid          temperature  <= 5           )
            ( pipe           size         <= 100         )
    →
            modify ( 1       context     valve selection completed )
            make ( valve     material    stainless-steel )
}
rule C {
            ( inference      context     valve selection )
            ( fluid          temperature  > 5
                             pressure     <= 7          )
            ( pipe           size         <= 100        )
    →
            modify ( 1       context     valve selection completed )
            make ( valve     material    titanium )
}
rule D {
            ( inference      context     valve selection )
            ( fluid          temperature  > 5
                             pressure     > 7           )
            ( pipe           size         <= 100        )
    →
            modify ( 1       context     valve selection completed )
            make ( valve     material    titanium )
}
```

CONTENTS OF THE RULE BASE AFTER LEARNING

VENN DIAGRAM OF THE RULE BASE AFTER LEARNING

PRIOR ART

| IDENTIFIER | CLASS | ATTRIBUTE 1 | VALUE 1 | ATTRIBUTE 2 | VALUE 2 |
|---|---|---|---|---|---|
| 101 : ( | FLUID | TEMPERATURE | 3.0 | PRESSURE | 2.0 ) |
| 102 : ( | PIPE | SIZE | 70 | | ) |
| 103 : ( | INFERENCE | CONTEXT | VALVE SELECTION | | ) |

CONTENTS OF WM (WORK MEMORY)
AFTER THE PROBLEM IS ENTERED

VENN DIAGRAM OF THE RULE BASE

PRIOR ART

FIG. 23

```
rule A {
         ( inference    context    valve selection )
         ( fluid        temperature    <= 5
                        pressure       <= 4        )
         ( pipe         size           <= 100      )
    →
         modify ( 1     context    valve selection completed )
         make ( valve   material   aluminum )
}
rule B {
         ( inference    context    valve selection )
         ( fluid        temperature    <= 5        )
         ( pipe         size           <= 100      )
    →
         modify ( 1     context    valve selection completed )
         make ( valve   material   stainless-steel )
}
rule C {
         ( inference    context    valve selection )
         ( fluid        temperature    > 5         )
         ( pipe         size           <= 100      )
    →
         modify ( 1     context    valve selection completed )
         make ( valve   material   titanium )
}
```

EXAMPLE OF THE RULE BASE (INITIAL STATE)

PRIOR ART

PRIOR ART

PRIOR ART

FIG. 27

| RULE | WM ELEMENT (IDENTIFIED BY TIME TAG) |
| --- | --- |
| RULE A | 103, 101, 102 |
| RULE B | 103, 101, 102 |

EXAMPLE OF A CONFLICT SET

PRIOR ART

FIG. 28

| IDENTIFIER | CLASS | ATTRIBUTE 1 | VALUE 1 | ATTRIBUTE 2 | VALUE 2 |
| --- | --- | --- | --- | --- | --- |
| 101 : ( | FLUID | TEMPERATURE | 3.0 | PRESSURE | 2.0 ) |
| 102 : ( | PIPE | SIZE | 70 | | ) |
| 104 : ( | INFERENCE | CONTEXT | VALVE SELECTION COMPLETED | | ) |
| 105 : ( | VALVE | MATERIAL | ALUMINUM | | ) |

CONTENTS OF WM (WORK MEMORY)
AFTER RULE A IS EXECUTED

PRIOR ART

INFERENCE METHOD AND INFERENCE SYSTEM

BACKGROUND OF THE INVENTION

1. Field of the Invention

This invention relates to a knowledge-base system (expert system) which solves problems in such fields as diagnosing, designing, and planning with the use of expert knowledge. More specifically, this invention relates to an inference system (inference method) suitable for acquiring control knowledge used to control knowledge operation according to the problem status.

2. Description of the Prior Art

One of the important tasks in building a knowledge base system is knowledge acquisition where the knowledge of a target field is defined and coded into a form processable by the inference engine. Traditionally, knowledge engineers collects knowledge primarily through an interview with experts and then codes collected knowledge into a form processable by the inference engine. However, because knowledge acquisition done by human beings requires much effort and time, it sometimes uses too much manpower during knowledge base system development. This is called a knowledge acquisition bottleneck.

Recently, a technology to support this knowledge acquisition has made a progress and, today, some tools to automate or support this knowledge acquisition process are available. And, depending upon the problem type (called a problem task) or target field type (called a target domain), the knowledge acquisition bottleneck has been reduced. However, many of these knowledge acquisition (support) tools, developed in order to acquire knowledge about the entity relation in some specific domain or about basic problem solving, are not practical.

When implementing a knowledge base system, it is important to control knowledge so that correct knowledge is used correctly according to the problem status. More often, the knowledge base system searches the knowledge base, containing a large amount of knowledge, for desired knowledge during the problem solving process. To do so, it requires search control that enables system, via a search method, to find solutions efficiently. Knowledge on this type of control (hereafter called control knowledge) is required regardless of whether the knowledge base system is of classification type or of structure type. However, it is very difficult to acquire this control knowledge because it usually consists of experience-based know-how.

The first reason for it is that, unlike knowledge on a problem task or a target domain which can be defined easily from the problem or target, control knowledge is acquired usually from the problem solving process in daily operation done by experts; it is in the expert's memory and is difficult to define.

The second reason is that not only this type of control knowledge, which controls knowledge operation or search, is related closely with a problem task or target domain but also acquisition and execution of new control knowledge greatly affects the execution of existing control knowledge. This means that, when acquiring new control knowledge, it is necessary to maintain compatibility with existing knowledge to prevent an inconsistency from being generated in the problem solving method.

One of the prior arts is HELLIC II (Reference: Nitta, et al: "HELLIC-II: A Legal Reasoning System on Parallel Inference Machine", Proceedings of the International Conference on Fifth Generation Computer System, ICOT, 1992.). HELLIC-II: is an integrated system using rule-based reasoning (RBR) and case-based reasoning (CBR) like the present invention.

In HELLIC-II, however, RBR and CBR modules interact by exchanging information through the central working memory.

Another existing method in tegrates RBR and CBR (Reference: Yasunobu, et al: "An integrated Method for Rule-Based Reasoning and Case-Based Reasoning", Journal of Japanese Society of AI, Vol. 7, No. 6, pp. 155–162, 1992). Unlike the present invention, this method (1) explicitly indexes cases to specific rules using a unified "If-Search-Then" syntax, and (2) lacks learning/knowledge acquisition modules to facilitate system growth during operation.

Another approach is to tune if-then rules temporarily by relevant cases (Reference: Nakatani, et al: "Tuning Rules by Cases", Topics in Case-Based Reasoning: Proceedings of the First European CBR Workshop, Lecture Notes in AI837, pp. 313–324, 1993). However, this approach is not to select among rules and cases done in the present invention.

So far, a number of knowledge acquisition (support) tools to acquire control knowledge have been proposed, as described above. However, the prior knowledge acquisition (support) tools have the following problems. First, they are less efficient to derive control knowledge potential in expert's memory. Second, they don't fully check the consistency with already-acquired knowledge. Third, acquired control knowledge cannot be matched efficiently.

The following explains this point more specifically using Rule-Based Reasoning (RBR) and Case-Based Reasoning (CBR) as examples:

The configuration and problems of a production system, a typical implementation of RBR, are as follows. FIG. 21 shows the configuration of a production system. It consists of the inference processing module 100, rule base 110, work memory 120, and input/output module 130. The inference processing module 100, in turn, consists of the rule matching module 101, conflict resolving module 102, execution processing module 103, and the inference controlling module 104 which controls these three modules. The input/output module 130 has the terminal 131 and keyboard/mouse 132.

The work memory 120, also called work storage or Working Memory (WM), is an area where input data or intermediate data is temporarily stored. This work memory 120 is usually allocated in main storage to allow modules to access data speedily. Data may be stored in the work memory 120 in any form; in the following discussion, typical production system data—class, attribute, and attribute value—is assumed. Each piece of data is called a WM element. FIG. 22 shows an example of work memory.

The rule base 110 contains "if . . . then" rules which are stored before problem solution starts. FIG. 23 shows an example of rules stored in the rule base 110. FIG. 24 shows the Venn diagram of the rule base 110. For simplicity, this figure shows only the fluid temperature (0 to 10) and fluid pressure (0 to 10). FIG. 25 is a diagram showing the problem classification tree of an example of rule base contents corresponding to those in the Venn Diagram in FIG. 24. In this figure, x corresponds to the fluid temperature, and y corresponds to the fluid pressure.

Next, by referring to the flowchart in FIG. 26, the following explains how the production system works. That is, the following explains how inference is performed using the rule base 110, shown in FIG. 23, and the work memory 120, shown in FIG. 22.

The rule matching module 101 first matches the conditional statements of the rules stored in the rule base 110 with the WM elements stored in the work memory 120, one at a time, and generates a set (called a conflict set) of pairs (called an instantiation which means a specific instance of a rule) of applicable rules and corresponding WM elements. FIG. 27 shows instantiations created in this step (step 140).

The conflict resolving module 102 selects only one of instantiations from the conflict set according to some specific rule (step 142). It selects a rule with the narrowest applicable range. As a result, rule A is selected from the conflict set shown in FIG. 27. The selection of an instantiation means the selection of a rule applicable at that point.

The execution processing module 103 executes the execution statement of the rule of the instantiation selected by the conflict processing module, using the matching data of the instantiation (step 143) Then, the system interacts with the user; that is, it displays information on the terminal 131 or reads data from the keyboard/mouse 132. At the same time, data is added to, changed in, or deleted from the work memory 120. In this example, a new WM element is created and added to the work memory 120. As a result, the contents of the work memory 120 are changed to those shown in FIG. 28.

Upon completion of execution processing, control goes back to the rule matching module 101 and, then, the inference cycle consisting of rule matching (step 141), conflict resolution (step 142), and rule execution (step 143) is repeated. This cycle is repeated until the inference stop instruction in the execution statement of a rule is executed (step 144) or until no matching rule is found in the matching processing (step 141). In this example, because there is no rule that matches added WM elements, the inference cycle is terminated.

The production system performs operation assuming that the conditional statement and execution statement of a rule are described correctly. So, if a rule contains descriptions unintended by the developer, problem solution generates an unintended result. For example, assume that stainless steel is intended as the material of a valve. The production system allows the user to change the rule base by adding a new rule or changing an existing rule. To do so, it is necessary to edit the contents of the rule base 110. There are some problems with this change; for example, the conditional statement of a rule must be reviewed, or consistency with exiting rules must be taken into consideration.

On the other hand, a system using CBR (Case-Based Reasoning) has a database (called a case base) which contains past problem solution cases. Upon receiving a new problem, the system retrieves a problem solution case similar to the received problem, modifies the result according to the problem, and generates a solution. This type of CBR consists typically of characteristic extraction, case retrieval, and case modification. Although excellent in acquiring knowledge, CBR has the problems when building an expert system.

First, it is difficult to build CBR support system. Second, it is too granular to be applied to the top-level problem solution. Third, it is not easy to include CBR into a production system widely used in inference applications.

It is an object of this invention to provide a system which acquires strategic and operational knowledge used to control knowledge usage and to solve the above-mentioned problems involved in prior systems having a similar object.

That is, to solve the problems with the prior arts described above, it is an object of this invention to provide an inference method and an inference system having a superior inference accuracy. It is another object of this invention to provide an inference method and an inference system capable of acquiring and using knowledge efficiently.

SUMMARY OF THE INVENTION

To achieve the above objects, the invention according to one embodiment is an inference method which performs inference using a set of rules, each consisting of a conditional statement describing generally a condition necessary for inference and a conclusion statement describing a conclusion corresponding to the condition; and a set of cases, each consisting of a conditional statement describing a condition representing a case and a result statement describing a result corresponding to the condition, said inference method comprising: a rule extracting process for extracting said rule having a condition which matches given input data; a case extracting process for extracting said case corresponding to an extracted rule; an evaluating process for evaluating the similarity of said rule and said case to said input data; a selecting process for selecting either said rule or said case which has a higher similarity to said input data; and an executing process for executing inference based on the conclusion statement of said selected rule or on the result statement of said selected case.

An invention according to another embodiment realizes the invention of the first embodiment from a standpoint of an apparatus and is an inference system which performs inference using a set of rules, each consisting of a conditional statement describing generally a condition necessary for inference and a conclusion statement describing a conclusion corresponding to the condition; and a set of cases, each consisting of a conditional statement describing a condition representing a case and a result statement describing a result corresponding to the condition, said inference system comprising: a rule extracting means for extracting said rule having a condition which matches given input data; a case extracting means for extracting said case corresponding to an extracted rule; an evaluating means for evaluating the similarity of said rule and said case to said input data; a selecting means for selecting either said rule or said case which has a higher similarity to said input data; and an executing means for executing inference based on the conclusion statement of said selected rule or on the result statement of said selected case.

An invention according to the first and second embodiments is an inference system which extracts both a rule and a case that match given input data and then determines which is more similar to the input data. And, the rule or the case, whichever is more similar to the input data, is used in inference. So, supplements or exceptions to a rule, if any, may be retained as cases for later use in the inference process, further increasing the inference accuracy. In addition, retaining supplements or exceptions without having to modify a rule makes it easy to configure and maintain the inference system. In a multi-stage inference, the conclusion statement of a rule or the result statement of a case calls another rule or case; in this case, a cycle consisting of operations, from extraction to inference, is executed for each stage.

The invention according to another embodiment is an inference method comprising: a rule storing process for storing a plurality of rules, each consisting of a conditional statement describing a condition required for inference and a conclusion statement describing a conclusion procedure judged by an expert; and a case storing process for storing a plurality of cases, each consisting of a conditional statement describing a condition used in an actual case and a result statement describing a result procedure executed under the condition; using a work area for temporarily storing data such as problem data entered via input process and hypothetical data generated during inference process; further comprising: an input process for accepting fact data entered by a user and for storing it into said work area; and an inference process for repeating a cycle until a processing stop procedure is executed, in which a rule stored in said rule storing process or a case stored in said case storing process, each corresponding to data stored in said work area, is selected and then the conclusion statement of a selected rule or the result statement of a selected case is executed, wherein one cycle of said inference process comprising: a rule extraction process for extracting an optimum rule by comparing data stored in said work area with a condition described in the conditional statement of each rule stored in said rule storing process; a case extraction process for extracting a case having a conditional statement describing at least partially matching with a condition described in the conditional statement of a rule extracted by said rule extraction process; a selection process for comparing the condition described in the conditional statement of the rule extracted from said rule extraction process with the condition described in the conditional statement of the case extracted by said case extraction process and for selecting either the rule or the case which is more similar to fact data entered said input process; and an execution process for executing the procedure in the conclusion statement of the rule or in the result statement of the case selected by said selection process.

An invention according to still another embodiment realizes the invention of the third embodiment from a standpoint of an apparatus and is an inference system comprising: (a) a rule storing means for storing a plurality of rules, each consisting of a conditional statement describing a condition required for inference and a conclusion statement describing a conclusion procedure judged by an expert; (b) a case storing means for storing a plurality of cases, each consisting of a conditional statement describing a condition used in an actual case and a result statement describing a result procedure executed under the condition; (c) a work area for temporarily storing data such as problem data entered via input means and hypothetical data generated during inference process; (d) an input means for accepting fact data entered by a user and for storing it into the work area; and (e) an inference means for repeating a cycle until a processing stop procedure is executed, in which a rule stored in the rule storing means or a case stored in the case storing means, each corresponding to data stored in the work area, is selected and then the conclusion statement of a selected rule or the result statement of a selected case is executed, wherein one cycle of the inference means comprising: (e1) a rule extraction processing module for extracting an optimum rule by comparing data stored in the work area with a condition described in the conditional statement of each rule stored in the rule storing means; (e2) a case extraction processing module for extracting a case having a conditional statement describing at least partially matching with a condition described in the conditional statement of a rule extracted by the rule extraction processing module; (e3) a selection processing module for comparing the condition described in the conditional statement of the rule extracted from the rule extraction processing module with the condition described in the conditional statement of the case extracted by the case extraction processing module and for selecting either the rule or the case which is more similar to fact data entered the input means; and (e4) an execution processing module for executing the procedure in the conclusion statement of the rule or in the result statement of the case selected by the selection processing module.

According to the inference system as described in the third and forth embodiments, the input means reads fact data into this system. Fact data is stored in a work area, and the inference means is started. The inference cycle of the inference means is as follows. First, the rule extraction processing module compares the rules stored in the rule storing means with data stored in the work storage means to extract an optimum rule. Then, the case extraction processing module extracts from the case storing means a case whose conditional statement describes a condition which matches that described in the conditional statement of the extracted rule. Then, the selection possessing module compares the condition of the extracted rule with that of the extracted case, and selects one of them which is more similar to the fact data entered via the input means. The execution processing module executes the procedure in the conclusion statement of the selected rule or in the result statement of the selected case.

Thus, the inference system according to the third and fourth embodiments uses in the inference process a rule or a case, whichever is more similar to the input fact data. Therefore, supplements or exceptions to a rule, if any, may be retained as cases for use in later inference, further increasing the inference accuracy. In addition, retaining supplements or exceptions without having to modify a rule makes it easy to configure and maintain the inference system. In a multi-stage inference, the conclusion statement of a rule or the result statement of a case calls another rule or case; in this case, a cycle consisting of operations, from extraction to inference, is executed for each stage. That is, the inference system according to the third and fourth embodiments repeats the inference cycle unless the executed procedure stops processing. The inference cycle is terminated when the executed procedure stops processing. Therefore, the inference system according to the third and fourth embodiments is suitable for multi-stage inference.

The invention according to another embodiment is an inference method as discussed in the first or third embodiments wherein said rule extraction process comprising: a matching process for comparing the condition described in the conditional statement of each rule stored in said rule storing process with data stored in said work area and for extracting a rule matching each data; and a conflict resolution process for selecting one rule, by using a specified method, when a plurality of rules are extracted by said matching process.

An invention according to another embodiment realizes the invention of the embodiment of the previous paragraph from a standpoint of an apparatus and is an inference system as discussed in the second and fourth embodiments, wherein the rule extraction processing module comprising: (e11) a matching processing module for comparing the condition described in the conditional statement of each rule stored in the rule storing means with data stored in the work area and for extracting a rule matching each data; and (e12) a conflict resolution processing module for selecting one rule, by using a specified method, when a plurality of rules are extracted by the matching processing module.

According to the inference system as discussed in the embodiments of the two paragraphs above, the matching processing module compares each rule stored in the knowledge rule storing means with data stored in the work area, and extracts a rule which matches the data. When the matching processing module extracts a plurality of rules, the conflict resolution processing module selects one of them with the use of a specified method.

The invention according to another embodiment is an inference method as discussed in the first and third embodiments, further comprising: a similarity evaluation knowledge storing process for storing the weights of the attributes constituting said conditions and similarity evaluation knowledge such as a similarity degree function for evaluating similarity between said condition and said fact data, and wherein a similarity degree used in comparison in said selection process is a value satisfying $$sim(P, Q) = \sum_i wt_i(P) \times sim_i(P, Q) \quad \text{[Formula 1]}$$

where, P is said condition, Q is said fact data, sim is a similarity between condition P and fact data Q, n is the number of attributes for condition P, $wt_i$ (i=1 to n) is a weight stored in said similarity evaluation knowledge storing process, and $sim_i$ ( ) (i=1 to n) is a similarity degree function stored in said similarity evaluation knowledge storing process.

An invention according to another embodiment realizes the invention of the embodiment in the paragraph above from a standpoint of an apparatus and is an inference system as discussed in the second and fourth embodiments, further comprising a similarity evaluation knowledge storing means for storing the weights of the attributes constituting the conditions and similarity evaluation knowledge such as a similarity degree function for evaluating similarity between the condition and the fact data, and wherein a similarity degree used in comparison in the selection processing module is a value satisfying $$sim(P, Q) = \sum_i wt_i(P) \times sim_i(P, Q) \quad \text{[Formula 2]}$$

where, P is the condition, Q is the fact data, sim is a similarity between condition P and fact data Q, n is the number of attributes for condition P, $wt_i$ (i=1 to n) is a weight stored in the similarity evaluation knowledge storing means, and $sim_i$ (i=1 to n) is a similarity degree function stored in the similarity evaluation knowledge storing means.

According to the inference system as discussed in the embodiments of the three above paragraphs, the selection processing module selects either a rule selected by the rule extraction processing module or a case extracted by the case extracting means by comparing the degrees of similarity to fact data. The calculation of the similarity degree is done by the similarity degree function $sim_i$ ( ) stored in the similarity evaluation knowledge storing means.

That is, both a condition and fact data contain a number of attributes each having a function for calculating a similarity degree. Each function uses two arguments, one for the attribute value of a condition and the other for the attribute value of fact data, for each attribute, and returns a similarity between these attribute values as the function value. This function may differ according to the nature of the attribute. In addition, each attribute has a weight according to the importance with regard to the whole similarity. And, the whole similarity between a condition and fact data is calculated by calculating a similarity with the use of the function, based on the attribute values of the condition and fact data, and then by calculating the total of the products of the similarity and the weight for all the attributes.

As a result, the higher the weight value (that is, the higher the importance value) of an attribute, the more the corresponding similarity affects the whole similarity. Thus, according to the invention according to the embodiments discussed in the five paragraphs above, a function which adjusts the similarity of each attribute and a weight which adjusts the importance of each attribute make it easy to increase the inference accuracy through the adjustment of the judgment criteria of the similarity between a condition and fact data.

The invention according to another embodiment is an inference method as claimed in any of the embodiments as discussed in the fifth paragraph above, further comprising: an inference history storing process for storing inference processing history for each cycle in said inference process; a re-executing process for re-executing inference processing, after inference processing in said inference process is finished, in said inference process according to inference processing history stored in said inference history storing process; an evaluation input process for accepting expert's evaluation on the inference process and inference result of inference processing performed in said re-executing process; and a case adding process for classifying said inference result into a correct case (positive case) and an incorrect case (negative case) according to the evaluation of an expert entered via said evaluation input process and for adding to said case storing process this evaluation result as well as a case whose conditional statement is said fact data and whose result statement is said inference result, wherein said inference process comprises a history storing process for storing the history of inference processing in each cycle into said inference history storing process.

An invention according to another embodiment realizes the invention of the embodiment discussed in the previous paragraph from a standpoint of an apparatus and is an inference system as discussed in the embodiment in the fifth paragraph above, further comprising: (f) an inference history storing means for storing inference processing history for each cycle in the inference means; (g) a re-executing means for re-executing inference processing, after inference processing in the inference means is finished, in the inference means according to inference processing history stored in the inference history storing means; (h) an evaluation input means for accepting expert's evaluation on the inference process and inference result of inference processing performed in the re-executing means; and (i) a case adding means for classifying the inference result into a correct case (positive case) and an incorrect case (negative case) according to the evaluation of an expert entered via the evaluation input means and for adding to the case storing means this evaluation result as well as a case whose conditional statement is the fact data and whose result statement is the inference result, wherein the inference means comprises a history storing processing module for storing the history of inference processing in each cycle into the inference history storing means.

According to the inference system as discussed in the embodiments of the previous two paragraphs, the re-execute means re-executes inference processing, after the inference means terminates inference processing, according to the history of inference processing stored in the inference history storing means. Expert's evaluation on the inference process and inference result of inference processing is received via the evaluation input means, positive cases and negative cases are generated according to expert's evaluation, and these positive and negative cases as well as the evaluation results are added to the case storing means. Added cases increase problem solution accuracy.

The invention according to another embodiment is an inference method as discussed in the embodiment in the third paragraph above, further comprising a similarity evaluation knowledge adjusting process for adding and changing, with the use of a specified method, similarity evaluation knowledge stored in said similarity evaluation knowledge storing process according to expert's evaluation entered via said evaluation input process.

An invention according to another embodiment realizes the invention of the embodiment discussed in the paragraph above from a standpoint of an apparatus and is an inference system as discussed in the embodiment of the third paragraph above, further comprising a similarity evaluation knowledge adjusting means for adding and changing, with the use of a specified method, similarity evaluation knowledge stored in the similarity evaluation knowledge storing means according to expert's evaluation entered via the evaluation input means.

According to the inference system as discussed in the embodiments of the two previous paragraphs, the similarity evaluation knowledge adjusting means adjusts similarity evaluation knowledge so that the rule/case selection means makes a correct decision. This adjustment allows a rule, positive case, or negative case to be selected correctly the next time a selection is made, increasing the inference accuracy.

The invention according to another embodiment is an inference method as discussed in the embodiments of the third and sixth paragraphs above, further comprising a rule adding process for creating a new rule from each case stored in said case storing process and for adding the created rule to said rule storing process while referencing similarity evaluation knowledge stored in said similarity evaluation knowledge storing process.

An invention according to another embodiment realizes the invention of the embodiment of the previous paragraph from a standpoint of an apparatus and is an inference system as discussed in the embodiments of the third and sixth paragraphs above, further comprising a rule adding means for creating a new rule from each case stored in the case storing means and for adding the created rule to the rule storing means while referencing similarity evaluation knowledge stored in the similarity evaluation knowledge storing means.

According to the inference system as described in the embodiments of the previous two paragraph above, the rule adding means creates a new rule from a case stored in the case storing means and adds it to the rule storing means. This learning process refines the rule storing means and increases the inference resolution accuracy.

Other and further objects, features and advantages of the invention will appear more fully from the following description.

BRIEF DESCRIPTION OF THE DRAWINGS

FIG. 3 is a diagram showing an example of the contents of the case base in the inference system used in the embodiment of this invention;

FIG. 5 is a conceptual diagram showing the configuration of a similarity between condition P and fact data Q in the inference system used in the embodiment of this invention;

FIG. 6(a) is a diagram showing an example of similarity evaluation knowledge in the inference system used in the embodiment of this invention;

FIG. 6(b) is a diagram showing an example of similarity evaluation knowledge in the inference system used in the embodiment of this invention;

FIG. 7 is a conceptual diagram showing how inference is performed in a plurality of cycles in the inference system used in the embodiment of this invention;

FIG. 10(a) is a diagram showing an example of the case base extension process in the inference system used in the embodiment of this invention;

FIG. 10(b) is a diagram showing an example of the case base extension process in the inference system used in the embodiment of this invention;

FIG. 11 is a diagram showing the attributes of problems P3 to P9 in the inference system used in the embodiment of this invention;

FIG. 12 is a diagram showing processing and case addition when problem P3 is added in the inference system used in the embodiment of this invention;

FIG. 18 is a diagram showing the contents of the rule base after learning in the inference system used in the embodiment of this invention;

FIG. 23 is a diagram showing an example of the rule base in a prior inference system;

FIG. 27 is a diagram showing an example of a conflict set in a prior inference system;

FIG. 28 is a diagram showing the contents of work memory after rule A is executed in a prior inference system.

Figure 1:
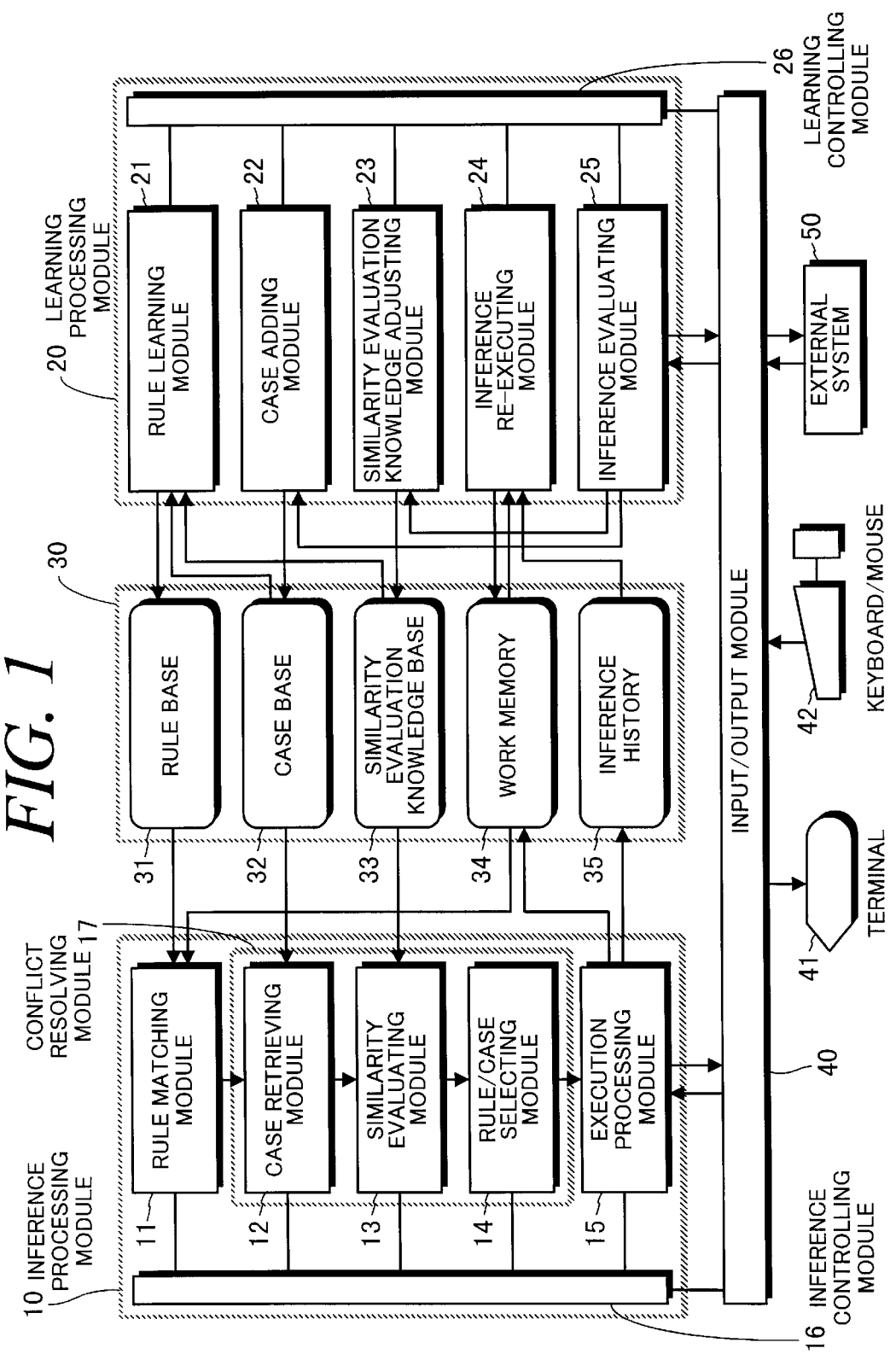
FIG. 1 is a block diagram showing the module configuration of the inference system used in the embodiment of this invention.

[Symbols]
10 . . . Inference processing module
11 . . . Rule matching module
12 . . . Case retrieving module
13 . . . Similarity evaluating module
14 . . . Rule/case selecting module
15 . . . Execution processing module
16 . . . Inference controlling module
17 . . . Conflict resolving module
20 . . . Learning processing module
21 . . . Rule learning module
22 . . . Case adding module
23 . . . Similar evaluation knowledge adjusting module
24 . . . Inference re-executing module
25 . . . Inference evaluating module
26 . . . Learning controlling module
30 . . . Databases/knowledge bases
31 . . . Rule base
32 . . . Case base
33 . . . Similarity evaluation knowledge base
34 . . . Work memory
35 . . . Inference history
40 . . . Input/output module
41 . . . Display
42 . . . Input device
50 . . . External system
60 . . . CPU
61 . . . Main memory
62 . . . Bus
63 . . . Disk unit
64 . . . Terminal
65 . . . Keyboard/mouse

DETAILED DESCRIPTION

Perred embodiments of the present invention (hereinafter referred to simply as "embodiments") shall now be described in detail with reference to the drawings. The functions of the embodiments are realized by the controlling of the computer and peripheral equipment by a prescribed software. That is, in the present specification, the invention and the embodiments are described by assuming virtual circuit blocks (e.g. ". . . means," ". . . module," etc.) that correspond to each of the functions and processes. Thus, each block is not in an one-to-one relationship with each hardware or software element.

Besides containing the main storage device comprised of a CPU and RAM, the computer for realizing the embodiments typically comprises input devices, such as a keyboard, mouse, etc., external storage devices, such as a hard disk device, etc., output devices, such as a CRT display device, printer, etc., and the necessary input/output control circuits. The scale, number, and type of computers and CPU's are not restricted in particular and computer networks, distributed processing, multitasking, etc. may be implemented freely. Furthermore, other input devices, such as a tracker ball, image scanner, etc., other storage devices, such as a floppy disk device, magneto-optical disk device, flash memory, etc., and other output devices, such as a liquid crystal device, etc., may also be used.

The form of software for realizing the embodiments may typically be an OS application software or machine language software compiled from a high-level language or assembly language. However, as long as the present invention may be implemented, the software may be freely modified and, for example, may be executed with an interpreter that does not use an OS. The storage form of the software is also not restricted and, for example, the software may be stored in a ROM and be read all at once or one part at a time from an external device. The form of storage may also differ according to the different parts of the software. Furthermore, each step of the process may be freely modified in sequence or processed in parallel as long as its characteristics are not violated.

In the present specification, the term "input" includes not only inputs from the exterior but also inputs from a file, etc. and not only inputs in the original meaning of the word but also echo backs, modifications, editing, etc. Similarly, the term "output" includes not only outputs to the exterior but also outputs to a file, etc. and not only outputs in the original meaning of the word but also designation of the output range, etc. The user interface mode is not restricted and may be an interactive mode, a menu mode, a graphical user interface, a multi-window, etc. The input and output may also be realized through integrated operations using interactive input/output procedures. The processes, such as selection, designation, specification, etc. may be performed through such integrated operations.

The form of data expression and the form of data storage means in the present specification are not restricted and, for example, the storage location of the data may be internal or external. The data may also be stored in a file form. The data needs only to be retained only while it is needed and may be deleted thereafter. Information that are not modified for the time being, such as dictionary data, may be stored in a ROM.

Furthermore, general information required for operation and the storage areas thereof, such as various pointers, stacks, counters, flags, parameters, work areas, buffers, etc., are used where appropriate even though these may not be specified in the present specification.

Unless otherwise indicated, the information required for the processing by each part of the embodiments are acquired by accessing, from other parts storing the corresponding information, the variable or memory that stores the corresponding information. The embodiments may also be realized along with or as part of another software and parts of the functions may be replaced by electronic circuits.

1. Configuration

This preferred embodiment relates to an inference system, which corresponds to claims 8 to 14, and an inference method executed on this inference system (which corresponds to claims 1 to 7). It is an object of this embodiment to provide an inference method and an inference system having a superior inference accuracy. It is another object of this invention to provide an inference method and an inference system capable of acquiring and using knowledge efficiently.

FIG. 1 is a block diagram showing the configuration of an inference system used in this embodiment. The inference system in this embodiment has the inference processing module 10, learning processing module 20, database/knowledge bases 30, and input/output module 40.

The inference processing module 10 consists of the rule matching module 11, case retrieving module 12, similarity evaluating module 13, rule/case selecting module 14, execution processing module 15, and inference controlling module 16 which controls these five modules. The case retrieving module 12, similarity evaluating module 13, and rule/case selecting module 14 are collectively called the conflict resolving module 17.

The learning processing module 20 consists of the rule learning module 21, case adding module 22, similarity evaluation knowledge adjusting module 23, inference re-executing module 24, inference evaluating module 25, and the learning controlling module 26 which controls these five modules.

The database/knowledge bases 30 consists of the rule base 31, case base 32, similarity evaluation knowledge base 33, work memory 34, and inference history 35. On a standard computer such as a workstation, the display 41 such as a CRT terminal and the input device 42 such as a keyboard/mouse are connected to the input/output module 40. In some cases, an external system 50 is connected via the input/output module 40.

Figure 2:
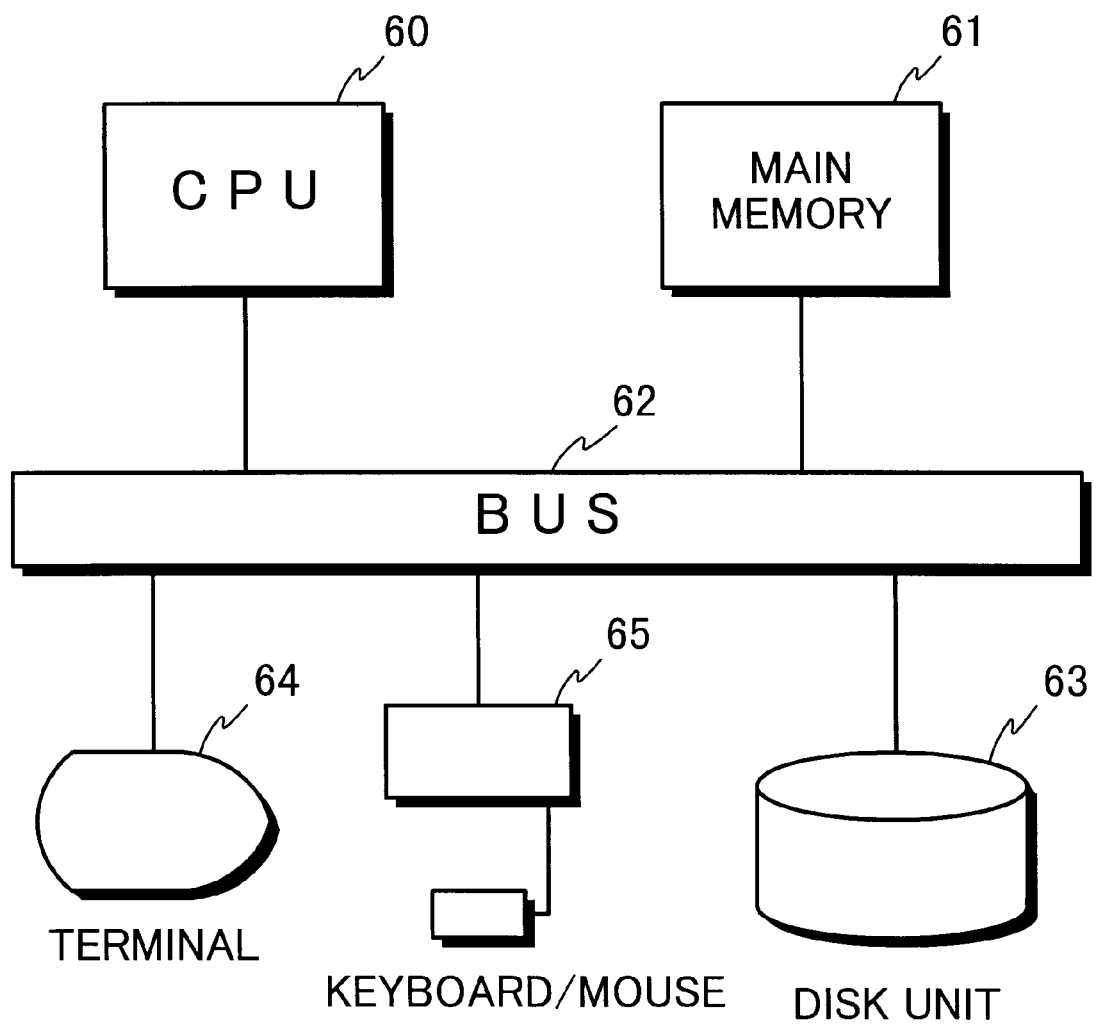
FIG. 2 is a block diagram showing a typical hardware configuration used to run the inference system in the embodiment of this invention.

FIG. 2 shows the hardware configuration of this embodiment. Processing programs stored in the CPU 60 and the main memory 61 are modules corresponding to the inference processing module 10 and the learning processing module 20, the disk unit 63 corresponds to the database/knowledge bases 30, and the terminal 64 and the keyboard/mouse 65 correspond to the input output module 40.

Figure 21:
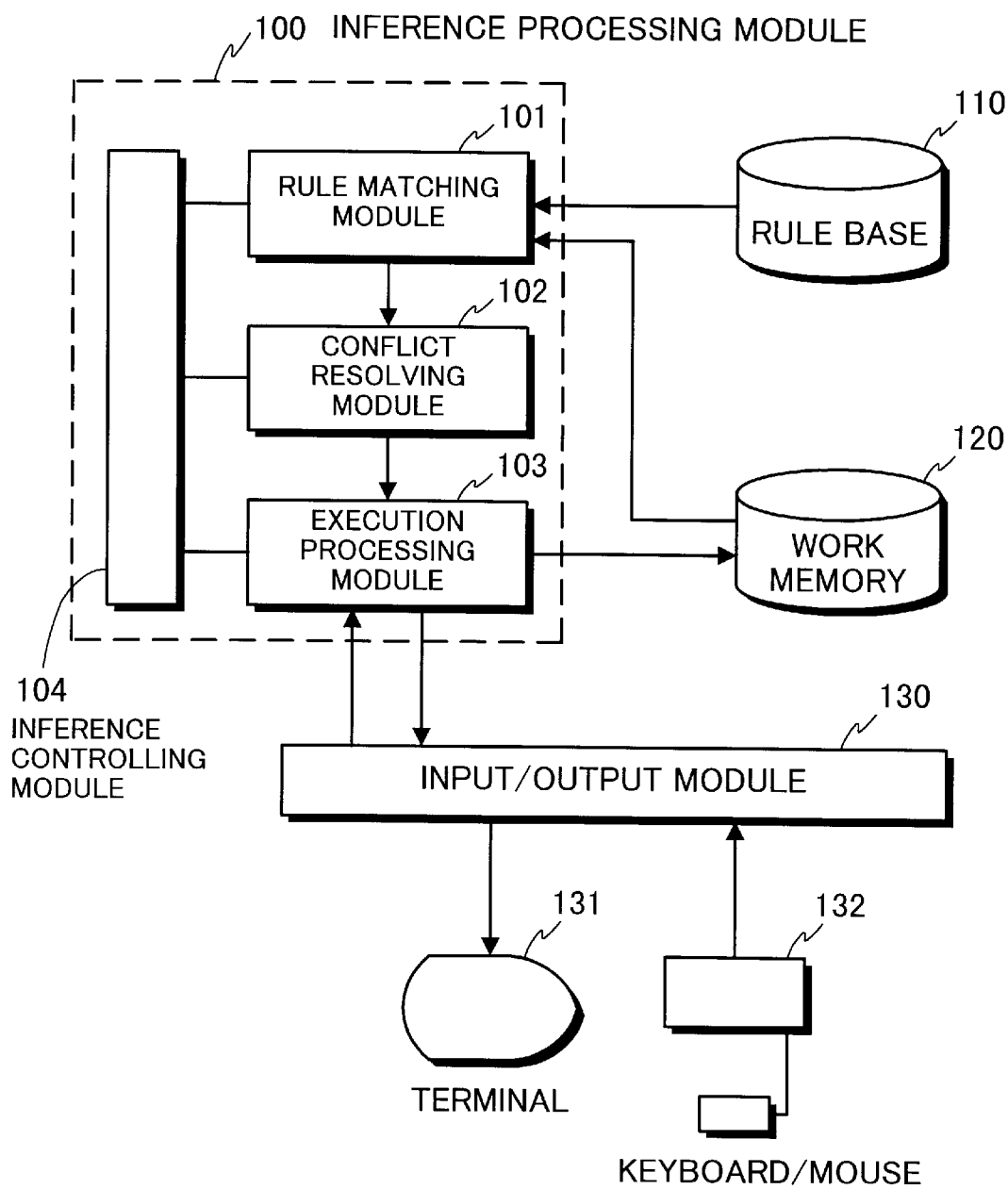
FIG. 21 is a block diagram showing the module configuration of a prior inference system.
Figures 22, 24:
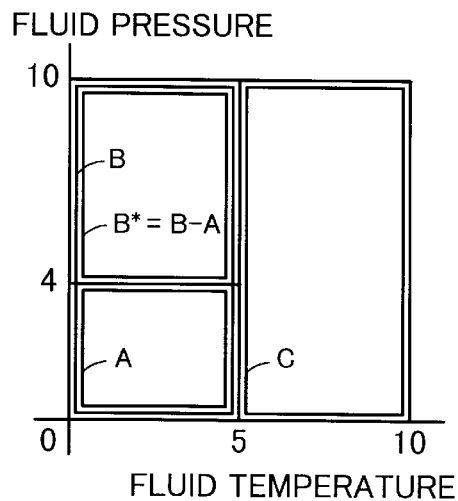
FIG. 22 is a diagram showing the contents of work memory after the problem is entered in a prior inference system.
FIG. 24 is a diagram showing the Venn diagram of the rule base in a prior inference system.
Figure 25:
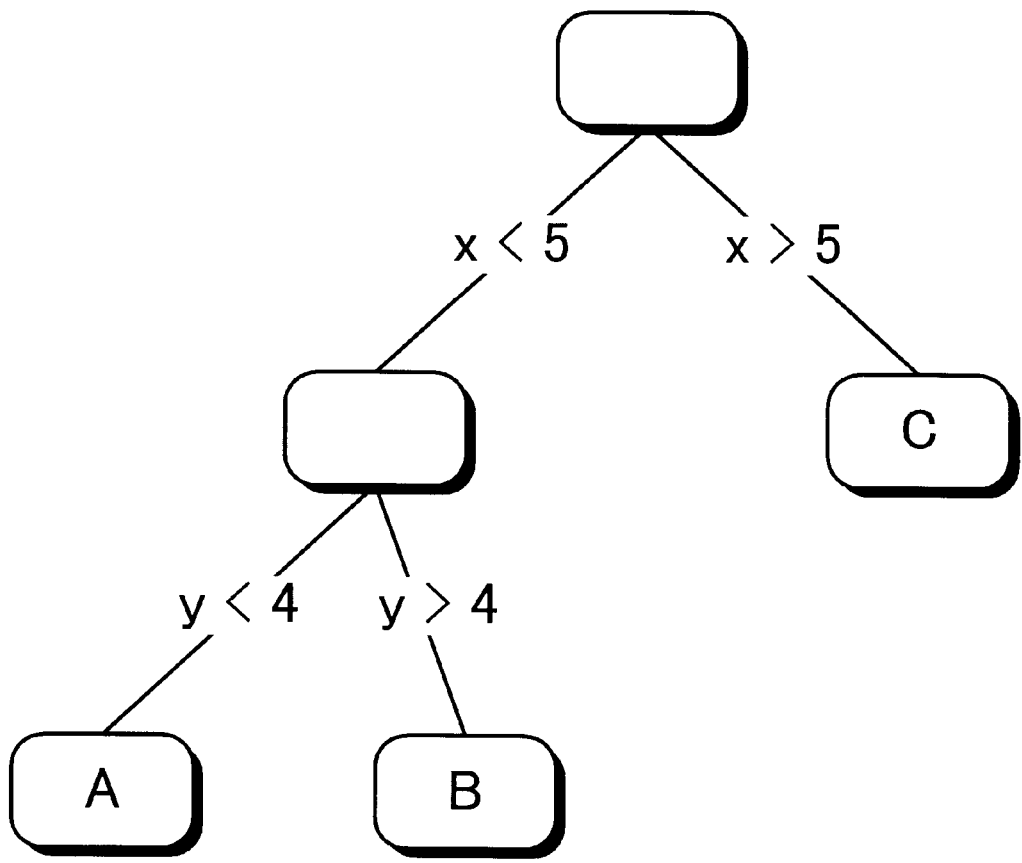
FIG. 25 is a diagram showing the problem classification tree of an example of rule base contents corresponding to those in the Venn Diagram in FIG. 24.
Figure 26:
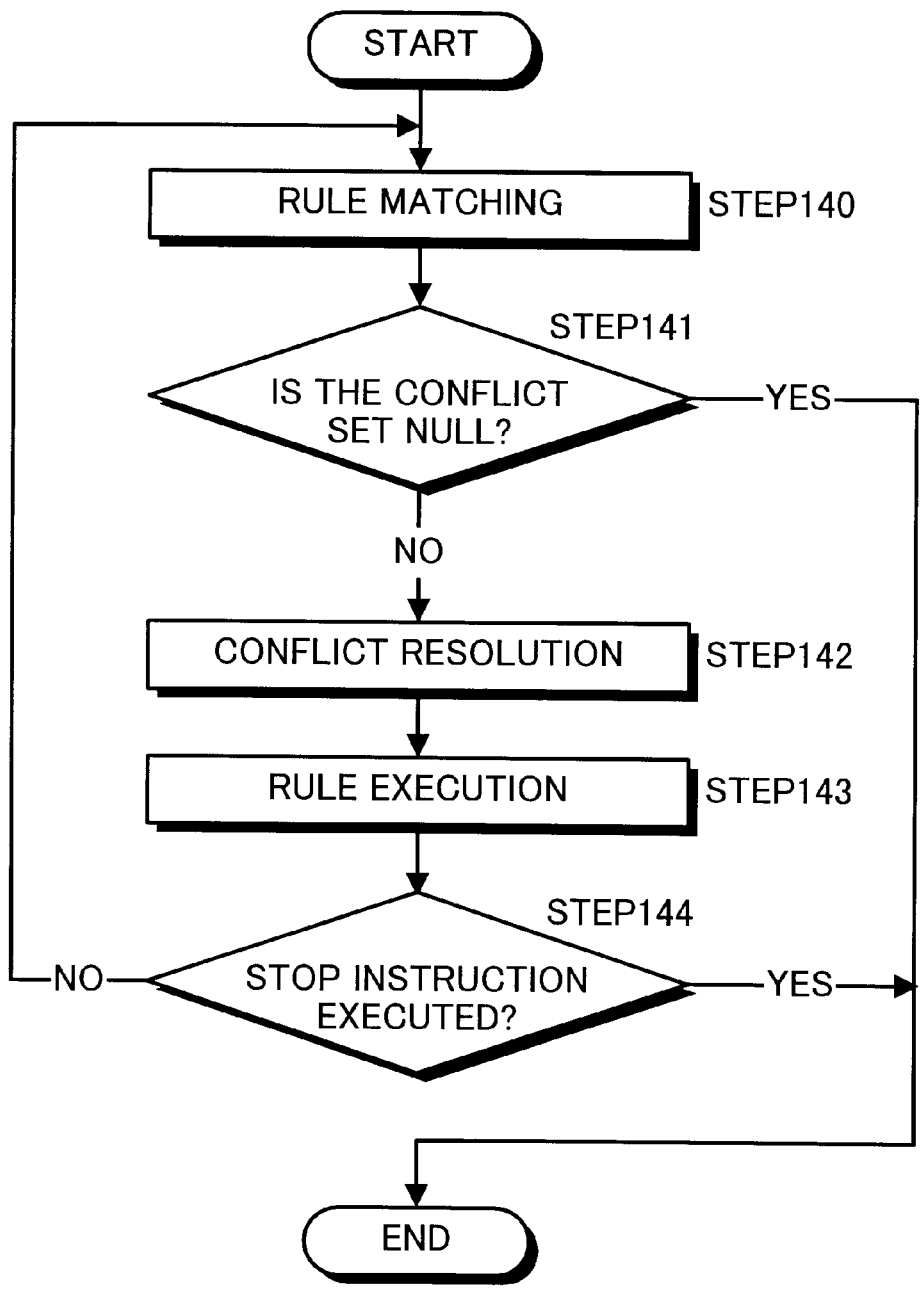
FIG. 26 is a diagram showing the flowchart of a prior production system.

The configuration of this embodiment is the same as that of the prior system, shown in FIG. 21, in that the prior system has the functions equivalent to the rule matching module 11, execution processing module 15, inference controlling module 10, rule storing module (rule base) 31, work memory 34, and input/output module 40 of this embodiment. The configuration of this embodiment differs from that of the prior system, shown in FIG. 21, in that the conflict resolving module 102 of the prior system is divided into the case retrieving module 12, similarity evaluating module 13, and rule/case selecting module 14 and in that the case base 32, similarity evaluation knowledge base 33, and inference history 35 are added.

This embodiment provides rules stored in the rule base 31 as well as cases stored in the case base 32. A rule consists of the conditional statement describing a general condition necessary for performing inference and the conclusion statement describing a conclusion for this condition. In this case, the conclusion contains not only a final conclusion but also a call to another rule or a case. A case consists of the conditional statement describing a specific case and the result statement describing a result for this condition. A case may be an actual case, or may be created based on an assumed example from which a conclusion is derived.

The case base 32 contains inference cases. An inference case consists of a single inference process or a plurality of input steps and output steps; that is, it consists of a pair of work storage data items containing specific values assigned at the start of a sequence of inference steps (first half) and the description or inference result of execution processing of the inference process (second half).

Therefore, when the input description of a case is stored in the work memory 34, the rule matching module 11 can identify a rule that matches the input description. When the rule matching module 11 can identify a rule R which matches a case C, the case C is said to match the rule R.

In this embodiment, it is assumed that a case stored in the case base 32 is made to correspond to a matching rule to increase retrieval efficiency (This is not always necessary). In the example given below, suppose that the cases shown in FIG. 3 are stored. In addition, a case is either a positive case or a negative case, depending upon whether or not the result description of the case matches the execution statement description of the rule with which the case matches. Cases stored in the case storing module (case base) are assumed to be classified into positive cases and negative cases.

2. Operation

[2-1. Overview]

Before starting inference, the user first gives data on which inference is to be based. Typically, input data is fact data representing a fact; it may also be a user-specified intermediate inference result to have the system continue the rest of the inference. Specified input data (fact data) is stored in the work area, and then the inference processing module 10 is started.

An example of the simplest inference is that a single rule or a case is applied to input data and then the final conclusion is obtained. In this case, a rule containing a condition matching the input data is first extracted. Then, a case corresponding to the extracted rule is extracted. The similarity check is made on the rule and the case thus extracted, and the rule or the case which is more similar to the input data is selected. And, the inference is performed based on the conclusion statement of the selected rule or on the result statement of the selected case.

For example, if there is a rule which matches input data as well as a case which corresponds to the rule and if the result statement of the case does not match the conclusion statement of the rule, this case is assumed to represent an exception to the rule. In this case, if fact data is very similar to the case, the result not matching the conclusion of the rule should be used as an exception even if the fact data belongs to the condition of the rule. In this way, the invention as claimed in claim 1 performs inference based on both the rule and the case.

Figure 4:
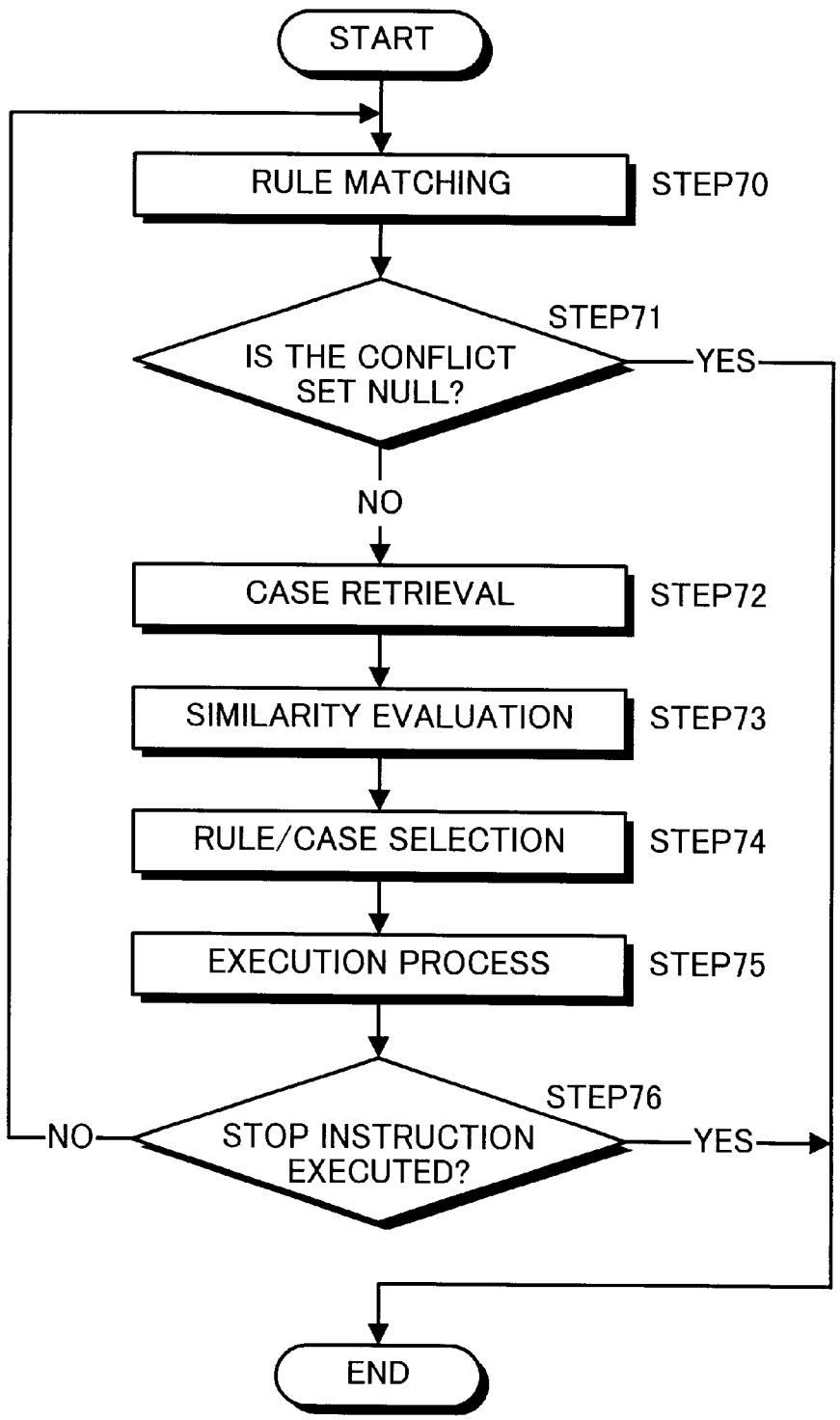
FIG. 4 is a flowchart showing the flow of processing in the inference system used in the embodiment of this invention.

Referring to the flowchart in FIG. 4, there is shown the processing of this embodiment.

[2-2. Rule Extraction Process]

First, a rule containing a condition which matches input data is extracted. Unlike a production system where the execution processing module 15 is started immediately after an instantiation is selected by the conflict resolving module 17, the execution processing module 15 in this embodiment is started after the case retrieving module 12, similarity evaluating module 13, and rule/case selecting module 14 are executed.

[2-3. Case Extraction Process]

The case retrieving module 12 retrieves a case which matches the rule of the selected instantiation (step 72). It is assumed that, when cases are stored into the case base 32, they are made to correspond to matching rules. This method allows the case retrieving module to retrieve cases simply and efficiently because it has only to retrieve cases with corresponding rule IDs from the case base 32. However, this method requires cases to be associated with rules in advance, meaning that their associations must be updated when more specialized rules are introduced.

There is another retrieval processing method in which a case is retrieved from the case base 32, after a rule is defined, using a case with the conditional statement of the rule as the retrieval condition. This method is relatively inefficient and therefore is not used in this system.

In this embodiment, a case which matches a rule with the most restrictive conditional statement is retrieved. For example, rule A is selected for the problem input shown in FIG. 3, and case C1 is retrieved.

[2-4. Similarity Degree Evaluation Process]

Then, the similarity evaluating module 13 evaluates the similarity between the input problem and an individual retrieved rule or case (step 73). Similarity is represented by a numeric value called a similarity degree. The similarity degree is defined as follows.

$$sim(P, Q) = \sum_i wt_i(P) \times sim_i(P, Q)$$ [Formula 3]

where, i corresponds to attributes A1 ... An, $wt_i$ is an attribute weight, and $sim_i$ is a similarity degree between the problem value and the case value for each attribute. They are all in the range 0 to 1.

That is, both a condition and fact data contain a number of attributes each having a function for calculating a similarity degree. Each function uses two arguments, one for the attribute value of a condition and the other for the attribute value of fact data, for each attribute, and returns a similarity between these attribute values as the function value. This function may differ according to the nature of the attribute. In addition, each attribute has a weight according to the importance with regard to the whole similarity.

For example, FIG. 5 is a conceptual diagram showing the configuration of a similarity between condition P and fact data Q. Condition P and fact data Q each have attribute Ai (A1–An), and each attribute Ai has an attribute value according to the meaning and format of each attribute. The weight $wt_i$ and the function $sim_i$ are defined for a set of attributes.

And, the whole similarity between a condition and fact data is calculated by calculating a similarity with the use of the function, based on the attribute values of the condition and fact data, and then by calculating the total of the products of the similarity and the weight for all the attributes.

As a result, the higher the weight value (that is, the higher the importance value) of an attribute, the more the corresponding similarity affects the whole similarity. Thus, in this embodiment, a function which adjusts the similarity of each attribute and a weight which adjusts the importance of each attribute make it easy to increase the inference accuracy through the adjustment of the judgment criteria of the similarity between a condition and fact data.

Another formula shown below is defined, where $dist_i = wt_i(P) \times (1 - sim_i(P, Q))$.

$$dist(P, Q) = \sqrt{\sum_i dist_i(P, Q)^2}$$ [Formula 4]

This formula converts a similarity degree to a distance which is easy to understand intuitively. These two are used in the following discussion as necessary. It is assumed that attribute weights depend on the rule and that the similarity degree definition is common.

The similarity evaluation knowledge base 33 contains knowledge to be used by the similarity evaluating module 13. FIG. 6 shows similarity evaluation knowledge.

[2-5. Rule/Case Selection Process]

Then, the rule/case selection module 14 selects a rule or a case, whichever has a condition having a higher similarity to the fact data. The conflict resolving module 102 of the prior system shown in FIG. 21 selects a rule (more precisely, an instantiation), whereas the rule/case selecting module 14 of this embodiment selects a rule (more precisely, an instantiation) or a case (step 74).

[2-6. Execution Process]

When a rule is selected, it is passed to the execution processing module 15, where the execution statement of the rule is executed. When a case is selected, the conclusion statement is passed to the execution processing module 15 and is executed there (step 75). Hereafter, rule execution is called RBR (Rule-Based Reasoning), while case execution is called CBR (Case-Based Reasoning).

The inference processing module 10 performs inference as many cycles as necessary, each cycle consisting of a sequence of operations described above (claims 2, 9). FIG. 7 is a conceptual diagram showing how inference is performed in a plurality of steps. As shown in this figure, the inference process, which derives a conclusion from fact data, contains the rule R and the case C. Note that some rule R or case C has a final conclusion (result). If such a rule or a case is detected during processing, inference is terminated.

As a cycle is repeated, processing results from the previous cycle, such as intermediate hypotheses, are passed to the next cycle via the work area as input data.

How many cycles are necessary for inference processing depends the input data that is used. The following explains a typical case. For example, assume that input data contains a plurality of items and that inference is performed to select some of them. Also assume that this inference uses some rules and cases. The condition of each rule or case contains some items included in the input data. A rule or a case represents the first type of operation and the second type of operation.

The first type of operation calls another rule or case depending upon the result of condition judgment. This means that, when a condition is satisfied or is not satisfied, a conclusion is not derived from the rule or the case only but that another rule or case is called. This is accomplished by storing rules or cases in the list format, each rule or case containing a backward pointer to a rule or a case to be called next.

The second type of operation selects a conclusion depending upon the result of condition judgment. This means that, when a condition is satisfied or is not satisfied, a conclusion is selected directly without making further judgment.

A condition is always included in a rule or a case, and which type of operation, first or second, is included in its conclusion depends on the rule or the case. That is, some rule or case calls another rule or case regardless of whether or not the condition is satisfied. Some other rule or case selects a conclusion regardless of whether or not the condition is satisfied, in which case the rule or case does not call another rule or case. Some other rule or case selects a conclusion when the condition is satisfied, and calls another rule or case when the condition is not satisfied.

Of course, in some cases, a rule or case may call another rule or case to make a judgment. This type of call is like a call in a computer program which calls another routine by function name. A rule or case, if called in this manner, creates a conclusion and returns it to the calling rule or case. In a nested logic, a recursive call is effectively used.

This inference cycle may be terminated in one of several ways. For example, a conclusion selection instruction as well as an inference termination instruction may be coded in the conclusion statement or result statement of a rule or case, or the inference driver may stop the inference cycle when a desired conclusion is selected. In addition, the inference may be terminated when a time-out condition occurs or when control goes into an endless loop.

That is, upon completion of execution processing, control goes back to the rule matching module 11 and, then the inference cycle consisting of rule matching (step 70), conflict resolution (steps 72 to 74), and rule execution (step 75) is repeated. This cycle is repeated, for example, until the inference stop instruction in the execution statement of a rule or in the conclusion statement of a case is executed (step 76) or until no matching rule is found in the matching processing (step 71).

In this embodiment, once a rule and a case which match input data are extracted, a check is made to see which one—rule or case—is more similar to the input data. And, either a rule or a case, whichever has a higher similarity degree, is used in inference. Therefore, supplements or exceptions to a rule, if any, may be retained as cases for use in later inference, further increasing the inference accuracy. In addition, retaining supplements or exceptions without having to modify a rule makes it easy to configure and maintain the inference system (claims 1, 8).

[2-7. Rule/Case Selection Criteria]

The rule/case selection criteria used in the rule/case selecting module 14 depend on the object of the rule or the case. The following explains inference processing refinement which is one of the objects of this embodiment.

The following explains the selection criteria on which selection between a case and a rule is based. The terms used in the discussion are defined below. A "positive case" is the case C which belongs to the rule R and whose latter half is consistent with the execution statement of the rule R. It is represented as +C or C+R. A "negative case" is the case C which belongs to the rule R and whose latter half is inconsistent with the execution statement of the rule R. It is represented as −C or C−R. The negative case −C which belongs to the rule R which matches the problem P is called a "conflict negative case." A "neighborhood" of the case C is defined as follows.

$$d = \min\{d_0, d(P, +C_i)\} \qquad \text{[Formula 5]}$$

That is, the neighborhood is a range whose radius is the shorter of the initialized threshold d0 or the distance to the most similar positive case. d0, which may be set to a system common value in the initial state, is narrowed during the tuning process described later.

The selection criteria depend largely on whether or not there is a conflict negative case. In the following discussion, let the problem be P, let the rule with which the problem P matches be the rule R (round square directly encircling P in the figure), let a positive case be +C, and let a negative case be −C.

[2-7-1. When There Is No Conflict Negative Case]

First, the following explains which rule or case is selected when there is no conflict negative case.

Figure 8:
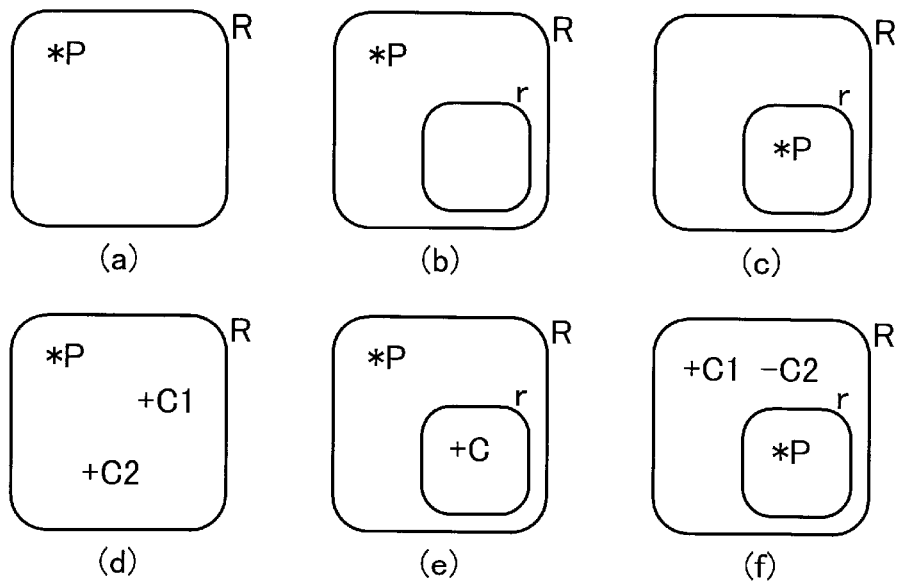
FIG. 8(a) is a diagram showing the criteria for selecting between a rule and a case in the inference system used in the embodiment of this invention; (when there is no conflict negative case)
FIG. 8(b) is a diagram showing the criteria for selecting between a rule and a case in the inference system used in the embodiment of this invention; (when there is no conflict negative case)
FIG. 8(c) is a diagram showing the criteria for selecting between a rule and a case in the inference system used in the embodiment of this invention; (when there is no conflict negative case)
FIG. 8(d) is a diagram showing the criteria for selecting between a rule and a case in the inference system used in the embodiment of this invention; (when there is no conflict negative case)
FIG. 8(e) is a diagram showing the criteria for selecting between a rule and a case in the inference system used in the embodiment of this invention; (when there is no conflict negative case)
FIG. 8(f) is a diagram showing the criteria for selecting between a rule and a case in the inference system used in the embodiment of this invention; (when there is no conflict negative case)

When there is a negative case C which includes P in the neighborhood, CBR is selected. When there is a plurality of such cases, the most similar negative case is used. In other cases, RBR is executed using R, or CBR is executed using a positive case. Referring to FIG. 8(*a*) to (*f*), there is shown a set of patterns where there is no conflict negative case. In all patterns, rule R or r is used.

That is, in FIG. 8(*a*), there is no case which matches rule R with which problem P matches. In this case, rule R is used. FIG. 8(*b*) is equivalent basically to FIG. 8(*a*). Rule R is used. That is, problem P matches rule R, not rule r. In FIG. 8(*c*), because there is no case for P, this is equivalent basically to FIG. 8(*a*). Rule r is used. There is no case for the outside (more general) rule either.

In FIG. 8(*d*), there are only positive cases for rule R with which problem P matches. Rule R or the most similar case +C1 may be used. The same conclusion is derived in both cases. In FIG. 8(*e*), there is no case for rule R−r with which P matches. Rule R is selected. Even if there is a positive case +C for rule r as shown in FIG. 8(*e*), it does not affect P which is associated only with rule R. If there is a negative case for rule r whose conclusion is the same as that of R, this is equivalent to 8(*e*) or (*f*), described later, in which there are conflict cases.

In FIG. 8(*f*), for the outside of rule R with which problem P matches, whether or not there is a positive or negative case does not affect selection. Rule r is selected. Because there is no case for problem P, this is equivalent basically to FIG. 8(*a*).

[2-7-2. When There is a Conflict Negative Case]

Next, the following explains which rule or case is selected when there is are conflict negative cases.

When there is a negative case which is very similar to the problem and when the most similar case is negative, the negative case is used instead of a rule or a positive case. In other cases, a rule or a positive case is used. That is, when there is a negative case but it is not very similar to the problem or when there is a positive case which is more similar to the problem than the similar negative case, the negative case is not used.

Figure 9:
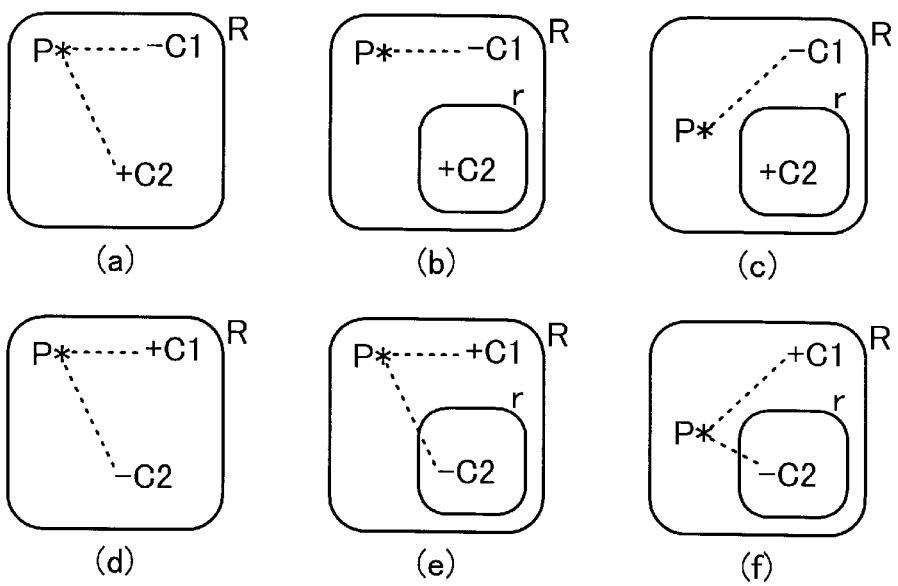
FIG. 9(a) is a diagram showing the criteria for selecting between a rule and a case in the inference system used in the embodiment of this invention; (when there is a conflict negative case)
FIG. 9(b) is a diagram showing the criteria for selecting between a rule and a case in the inference system used in the embodiment of this invention; (when there is a conflict negative case)
FIG. 9(c) is a diagram showing the criteria for selecting between a rule and a case in the inference system used in the embodiment of this invention; (when there is a conflict negative case)
FIG. 9(d) is a diagram showing the criteria for selecting between a rule and a case in the inference system used in the embodiment of this invention; (when there is a conflict negative case)
FIG. 9(e) is a diagram showing the criteria for selecting between a rule and a case in the inference system used in the embodiment of this invention; (when there is a conflict negative case)
FIG. 9(f) is a diagram showing the criteria for selecting between a rule and a case in the inference system used in the embodiment of this invention; (when there is a conflict negative case)

Referring to FIG. 9(a) to (f), there is shown a set of patterns where there are conflict negative cases. In FIG. 9(a) to (c) and (f), a negative case is used; in FIG. 9(d) or (e), a rule or positive case is used. In all cases, negative cases are assumed to be very similar to the problem.

In FIG. 9(a), because there is a negative case which is very similar to rule R with which problem P matches and because it is more similar than the positive case, the negative case is used. Note that problem P is in the neighborhood of −C1. In FIG. 9(b), because the positive case matches, not rule R, but rule r, the positive case which matches rule r need not be taken into consideration. In FIG. 9(c), because the positive case matches, not rule R, but rule r, the positive case which matches rule r need not be taken into consideration. Therefore, negative case −C1 is used even if positive case +C2 is more similar than negative case −C1, as shown in FIG. 9(c).

In FIG. 9(d), although there is a negative case which is very similar to rule R with which problem P matches, the rule or the positive case is used because the positive case is more similar. In this case, it is thought that the neighborhood of the negative case (applicable range of negative case) is narrowed by the positive case.

In FIG. 9(e), although the negative case matches, not rule R, but rule r, it is taken into consideration, assuming that it matches rule R, if its execution statement matches rule R. It is thought that the conditional statement of rule r, which is less restrictive, includes a case which should match R. In this case, the rule or the positive case is used because the positive case is more similar (see FIG. 8(e) in which there is no conflict case). If the execution statement of the negative case matches neither rule R nor r, it is ignored assuming that it is an exception of r.

FIG. 9(f) is similar to FIG. 9(e) except that the distance to the positive case and that to the negative case are reversed (The negative case is more similar). Therefore, the negative case is used (see FIG. 8(e) in which there is no conflict case).

So much for the description of the configuration and operation of the inference processing module 10.

[2-8. Learning Process]

The following explains the configuration and operation of the learning processing module 20. In this embodiment, three methods described below are used to solve problems more precisely.

The first method extends the case base 32 (case adding module 22). In this method, the system gets a success/failure feedback to the system output from outside sources (experts, simulators), generates positive and negative cases, associates them with matching rules, and stores them into the case base 32.

The second method tunes similarity retrieval knowledge (similarity evaluation knowledge adjusting module 23). This method, which includes a similarity between a problem and a negative case or positive case into a selection criteria used to determine which (rule or negative case) is used, allows the user to tune the similarity to increase the selection accuracy for rules and negative cases as well as the accuracy for problem solution.

The third method refines the rule base 31 (rule learning module 21). This method allows the end nodes of a problem classification tree to branch and, therefore, the tree to grow. This method refines the conditional statement of a rule. From the viewpoint of CBR, this method refines case indexing.

These methods enable the cases stored in the case base 32 to be used directly in CBR as well as in tuning a similarity degree or in refining a problem classification tree. Many prior systems learned rules from a plurality of cases, but many of them did it only inductively. In those systems, the problem of descriptive attribute selection still remains unresolved. This method allows description attributes to be selected based on tuned similarity knowledge. The following explains each method.

[2-8-1. Case Base Extension]

First, the following explains the first method in which the evaluation of inference process or inference result is fed back in order to extend the case base 32.

In extending the case base, the inference history data for each inference cycle is stored, inference processing is re-executed (reproduced) according to the stored history data after inference processing is terminated, and the inference result in each reproduced process is re-evaluated. In each process, the inference results are classified into the cases evaluated as consistent (positive cases) and the cases evaluated as inconsistent (negative cases), and these evaluation results as well as cases, each of which contains fact data in the conditional statement and inference result in the result statement respectively, are stored in the case storing means. Storing cases in this manner increases the problem solution accuracy (claims 5, 12).

In this embodiment, factors external to the system output, such as success/failure feedback information from an expert or a functionally-equivalent system (such as a simulator), extend the knowledge. The system checks this feedback information to generate positive or negative cases and, after associating them with matching rules, stores them in the case base 32.

To do so, the system first feeds back success/failure information about the final solution or an intermediate solution from an expert or some other system, and then determines the success or failure of an individual refinement module executed during problem solution process. Next, the system generates positive cases or negative cases depending upon whether a rule is used or a negative case is used during problem solution in the individual refinement module.

Success (correct) of the final solution means that all the refinement modules executed during the problem solution process succeeded (correct). If the final solution failed (incorrect), it is necessary to trace the problem solution process and to identify a failed (incorrect) module. Tracing may be started at any point: at the final solution into the backward direction, at the problem input point into the forward direction, or at an intermediate suspecting module. Which start point should be used depends upon whether correct information is fed back by a human being (expert) or by a system (simulator, etc.). Once the failed module is identified, it is necessary to have an expert or a system enter a correct solution. Unless correct information on the failed module is obtained, the negative case cannot be modified. And, neither similar retrieval knowledge is tuned nor is the rule base 31 refined.

The system generates positive and negative cases as described below, associates them with matching rules, and stores them into the case base. The following also explains how added cases increase problem solution accuracy. FIG. 10 shows how positive and negative cases are stored in the area of rule C.

When a rule is used in a succeeded module, a positive case is added. A system, which uses a positive case as if it was a macro, skips a failure which would occur in other modules when the rule is used, thus increasing problem solution accuracy.

When a negative case is used in a succeeded module, a negative case is added. More and more negative cases reaching the same conclusion enable a negative-case applicable range to be identified more clearly and a selection between a rule and a case to be made more precisely.

When a rule is used in a failed module, a negative case is added. An exceptional status, once added as a negative case, can be used in subsequent processing to give a correct problem solution using this negative case.

If a negative case is used in a failed module, a positive case is added when the correct solution is the same as the conclusion of the rule.

Decreasing the threshold of a permission of a negative case (that is, decreasing the neighborhood) increases the selection accuracy of a negative case (A neighborhood was defined above).

When the correct solution differs from the conclusion of the rule, a negative case is added. An exceptional status, not yet added, is added as a new negative case, making it possible in subsequent processing to give a correct problem solution using this negative case.

Next, an example is shown here to explain how a rule or a case is selected and how added cases make inference more accurate. The problems shown in FIG. 11 are given, one at a time, and, each time problem solution is performed, inference evaluation, inference re-execution, and case adding are performed. The result is that inference and case addition are done, as shown in FIG. 12 to 16.

FIG. 12 shows inference and case addition when problem P3 is given. Because the problem is in the neighborhood of negative case C1, and there is no other case, CBR is executed using C1. That is, the conclusion "special titanium" is derived according to C1. Assume that an expert accepts this output as correct. Then, the case adding module 22 adds problem P3 as negative case −C3.

Figure 13:
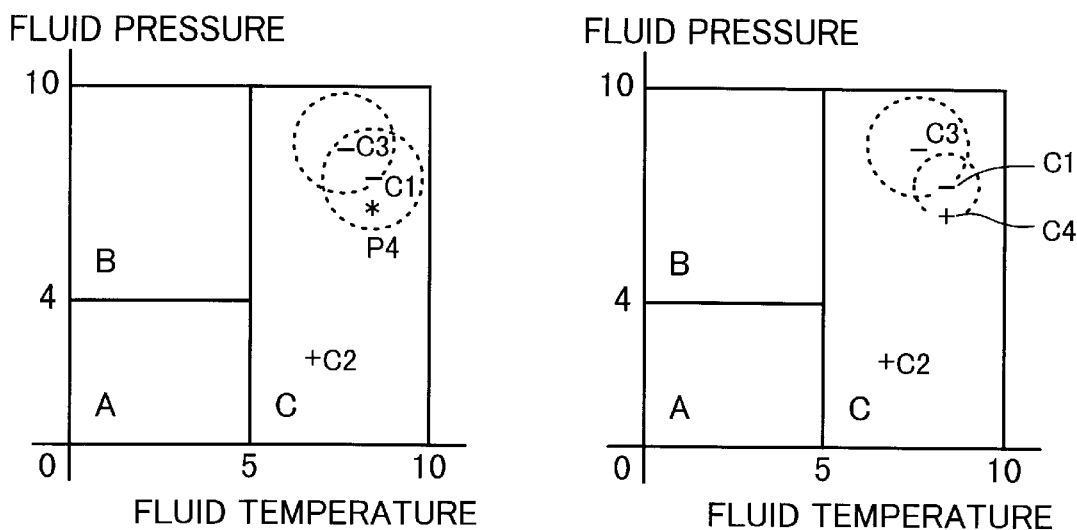
FIG. 13 is a diagram showing processing and case addition when problem P4 is added in the inference system used in the embodiment of this invention.

FIG. 13 shows inference and case adding when problem P4 is given. Because the problem is in the neighborhood of negative case C1, and there is no other case, CBR is executed using C1. That is, the conclusion "special titanium" is derived according to C1. Assume that an expert judges this output as incorrect and he pointed out that the correct solution is "titanium". Because this correct solution is the same as rule C, it is added as a positive case of rule C. As a result, the neighborhood of negative case C1 is reduced to the minimum size required to exclude +C4.

Figure 14:
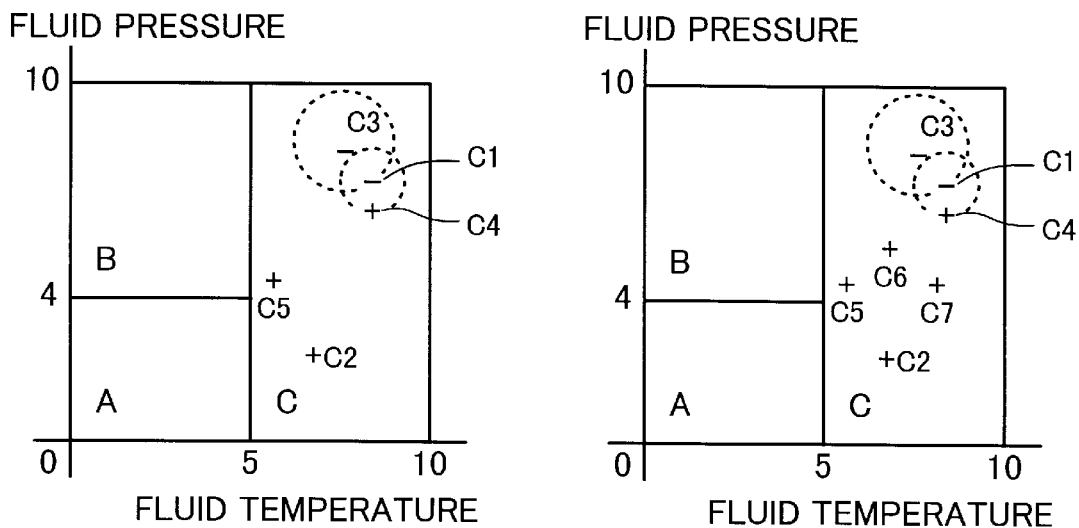
FIG. 14 is a diagram showing processing and case addition when problems P5 to P7 are added in the inference system used in the embodiment of this invention.

FIG. 14 shows inference and case adding when problem P5 is given. P6 and P7 are also given, and cases are added. Because there is no negative case which includes them in the neighborhood, rule C is used and the conclusion "titanium" is derived. Because an expert judges that the result is correct, these problems are added as positive cases.

Figure 15:
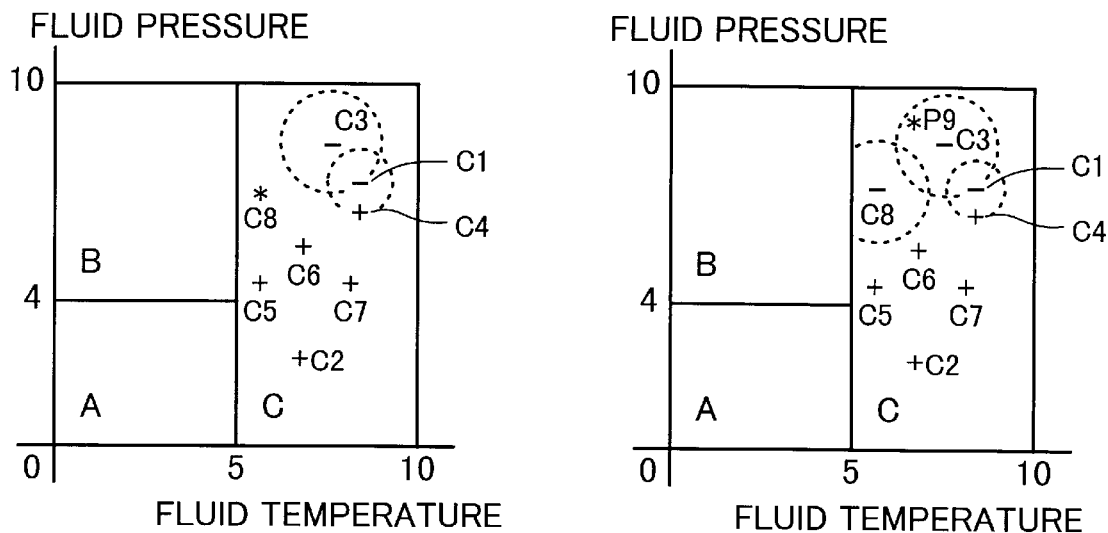
FIG. 15 is a diagram showing processing and case addition when problem P8 is added in the inference system used in the embodiment of this invention.

FIG. 15 shows inference and case addition when problem 8 is given. Because there is no negative case in the neighborhood, the conclusion "titanium" is derived using rule C. However, an expert judges the conclusion as incorrect, and the solution is corrected to "special titanium". Because this contradicts the conclusion of rule C, problem P8 is added as a negative case of rule C.

Figure 16:
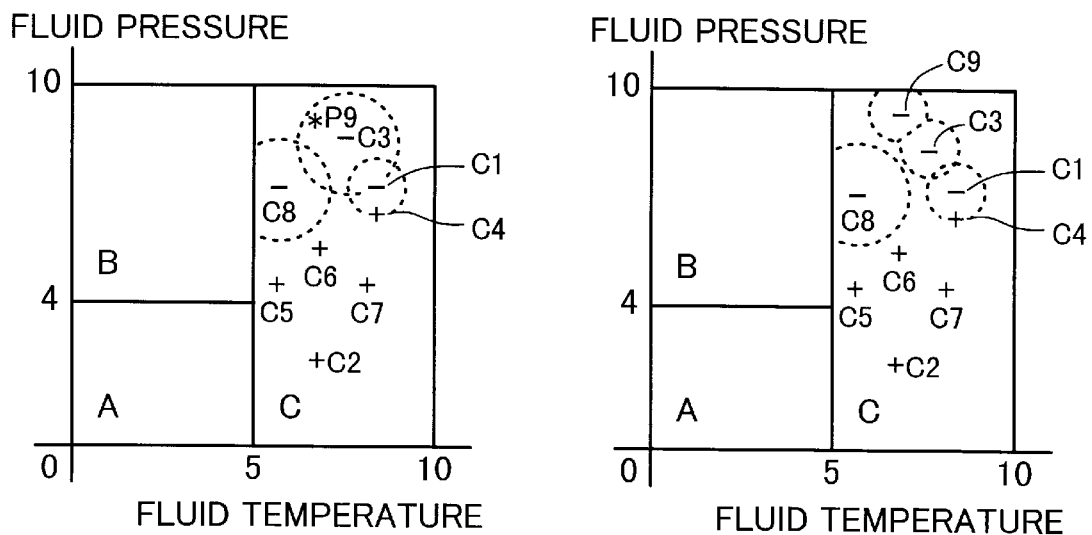
FIG. 16 is a diagram showing processing and case addition when problem P9 is added in the inference system used in the embodiment of this invention.

FIG. 16 shows inference and case addition when problem 9 is given. Because the problem is in the neighborhood of negative case C3, and there is no other case, CBR is executed using C3. That is, the conclusion "special titanium" is derived according to C3. However, an expert judges the conclusion as incorrect, and the correct solution is corrected to "chrome molybdenum". Because this contradicts the conclusion of rule C, problem P9 is added as a negative case of rule C. Because this conclusion differs from that of C3, the neighborhood of C3 and C9 are reduced to the mutually exclusive size. The result of a sequence of problem solution and case addition is shown in FIG. 10(b).

[2-8-2. Adjustment of Similarity Degree Knowledge]

Next, the following explains the second method in which the similarity evaluation knowledge adjusting module 23 tunes similarity evaluation knowledge. Similarity evaluation knowledge is tuned by changing similarity degree knowledge so that, when there is a failed step, the same problem will succeed the next time it is given in that failed step.

In tuning similarity evaluation knowledge, knowledge used to evaluate a similarity is adjusted based on the evaluation of the inference result in each inference process. So, the next time a similar problem is given, rules, positive cases, and negative cases are selected correctly and, as a result, the inference accuracy is increased (claims 6, 13).

As described above, the similarity degree is defined as follows in this embodiment.

$$sim(P, Q) = \sum_i wt_i(P) \times sim_i(P, Q) \qquad \text{[Formula 6]}$$

where, $wt_i$ is an attribute weight defined for each rule, and $sim_i$ is the degree of similarity between a problem value and a case value for each attribute that is common in the system. Although both the weight $wt_i$ and the similarity degree definition may be tuned, only the weight is tuned for the same reason the weight is defined for each rule (described above).

Figure 17:
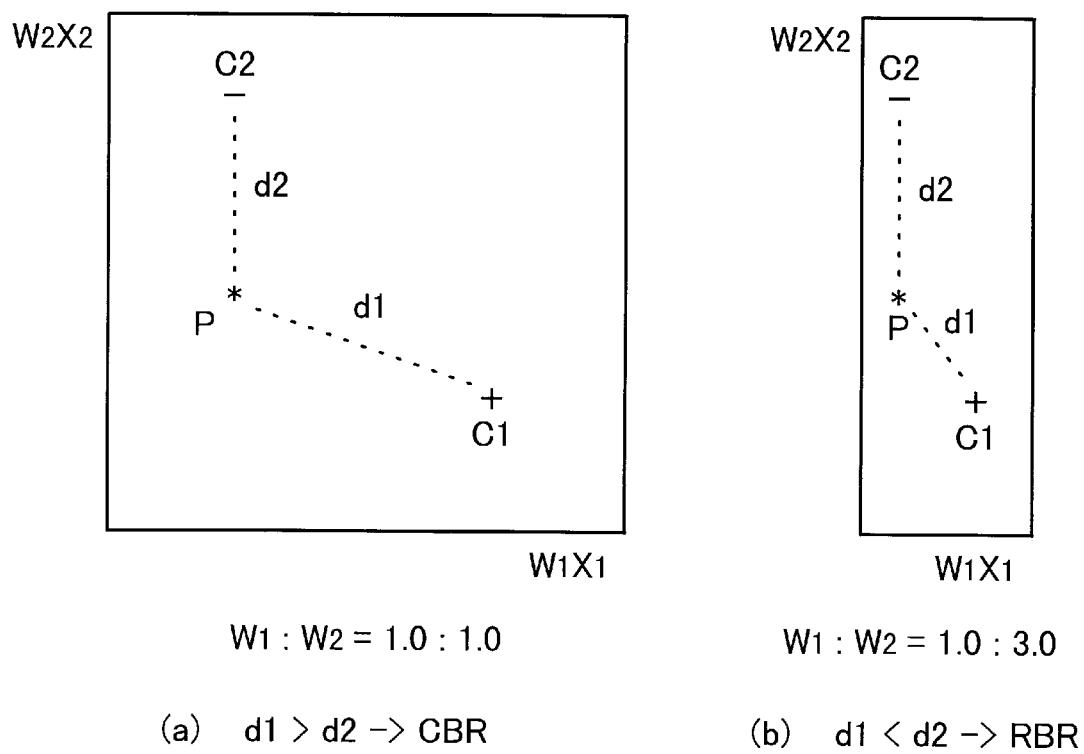
FIG. 17(a) is a diagram showing similarity knowledge tuning in the inference system used in the embodiment of this invention.
FIG. 17(b) is a diagram showing similarity knowledge tuning in the inference system used in the embodiment of this invention.

The tuning method is described using the example in FIG. 17. FIG. 17(a) shows the status before tuning, while FIG. 17(b) shows the status after tuning. In FIG. 17(a), because problem p is closer to negative case −C2 than to positive case +C1 (the similarity degree is larger), CBR is performed using the negative case. However, assume that the rule should be used. That is, because of incorrect similarity degree knowledge, negative case C2 cannot be excluded by positive case +C1. Therefore, the weight is adjusted so that the following formula is satisfied.

$$sim(P, +C1) > sim(P, -C2) \qquad \text{[Formula 7]}$$

that is, $$dl_0 = dist(P, +C1) < dist(P, -C2) = d2 \qquad \text{[Formula 8]}$$

For example, if the weight 1:1 shown in FIG. 17(a) is changed to 1:3 as shown in FIG. 17(b), the distance relation (similarity relation) is reversed as shown in the weighed coordinate system in FIG. 17(b). As a result, +C1 is correctly selected instead of −C2.

There are a number of numerical calculation methods. One of them is a method set forth by Japanese Patent Publication No. 4-147528 (similar information retrieval system, Hattori). A method similar to the adjustment of similarity degree for each attribute, proposed by Japanese Patent Publication No. 5-65725 (similarity retrieval system, Tanaka), may also be used to adjust the importance among attributes. These prior arts, which use a distance between cases as constraint conditions as shown in formulas 7 and 8, define formulas for use in linear programming in which a change from the current value is minimized, and solve similarity degree (importance) adjustment problems by means of linear programming.

[2-8-3. Learning of New Rules]

Next, the following explains the third method in which the rule learning module 21 learns new rules.

The system creates new rules, based on case groups each consisting of similar cases, as it learns new rules, refining rules for inference and increasing the inference solution accuracy (claims 7, 14).

Figure 19:
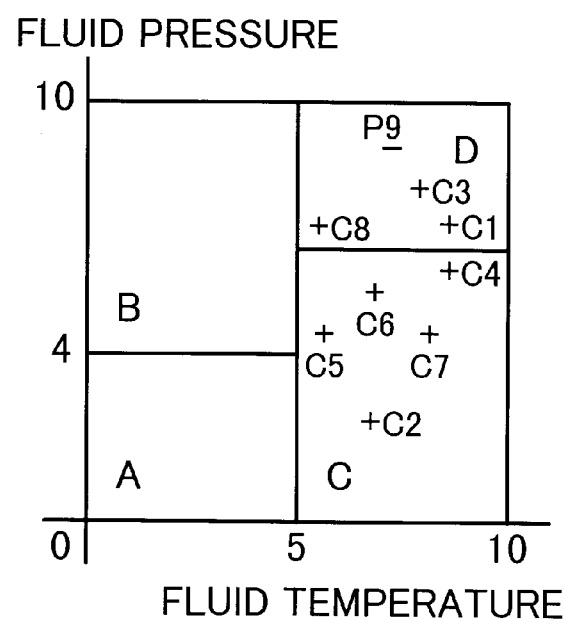
FIG. 19 is a diagram showing the Venn diagram after learning in the inference system used in the embodiment of this invention.
Figure 20:
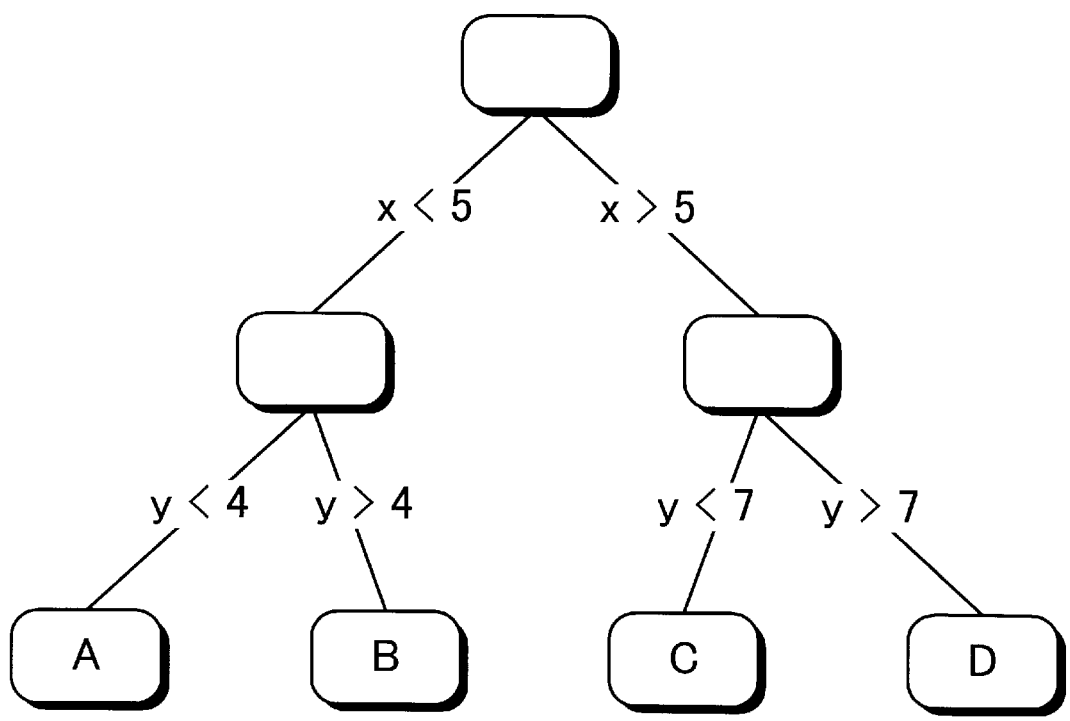
FIG. 20 is a diagram showing the problem classification tree of an example of rule base contents corresponding to those in the Venn Diagram in FIG. 19.

Through automatic learning where no user interaction is involved as well as knowledge acquisition where user interaction is involved, rule C used before learning is refined into rule D consisting mainly of exceptional cases, as shown in FIGS. 18 and 19. Note that a negative case whose conclusion was D is now a positive case for rule D formed by learning. FIG. 20 is a diagram showing an example of rule base contents corresponding to those shown in the Venn diagram in FIG. 19. In this figure, x corresponds to the fluid temperature, while y corresponds to the fluid pressure.

Case C9 whose conclusion is "special titanium" is still a negative case for new rule D. As more and more cases are added, rule D may be formed into form E which is further specialized. In this way, a further specialized rule is formed around negative cases and, as a result, the rule base is refined.

When a large number of cases are accumulated, automatic learning can be executed, through an inductive learning algorithm, as a method of specialization. Inductive learning extracts rules common to many training examples each of which consists of a problem and a result. There are many variations of training examples, rules, and learning processes.

In this specification, the problem of a training example is represented by a set of a plurality of attributes and values, and the result is represented by a set of an attribute and a value. The cases shown in FIG. 3 may be used as a training example. In that figure, the inference context, fluid temperature, fluid pressure, and pipe size are the attributes of the problem, and the valve material is the attribute of the result. The problems in FIG. 11 may be used as training examples if solution information on the valve material is given.

There are a number of variations of inductive learning algorithm, with the original being what we call ID3 (Reference: J. R. Quinlan, "Introduction of Decision Trees", Machine Learning Vol. 1, No. 1, pp. 81–106, 1986). Several improvements have been added to the algorithm, and the most sophisticated one that can be used in this invention is C4.5 (Reference: J. R. Quinlan, "C4.5: Programs for Machine Learning", Morgan Kaufmann Publishers, 1993). In these algorithms, a learning result is represented by a decision tree. Each node of this tree represents a test. When a new problem is applied to this tree, we follow branches according to the test result until the leaf node is reached where the solution is described.

In a decision tree, as many if-then rules as leaf nodes can be extracted by putting together the tests from the leaf node to the root node. This invention uses if-then rules, such as those shown in FIG. 18, extracted from the inductive learning results. Note that some elements of inductive learning results must be modified; for example, the syntax must be modified according to the rule or the inference context on the first line of execution statement must be modified. These details are not described here.

However, when there are not so many cases, it is necessary to acquire knowledge interactively, for example, through an interview with an expert, or to deductively learn rules through inference from the background of the target domain (model).

A variety of methods for acquiring knowledge through an interview are proposed, but none of them is a final one. Rather, it is necessary to build a system tailored for an individual target domain or problem task. In the embodiment of this invention, classification problems in the industrial field are treated. In this case, the following method may be used.

Assume that rule C in FIG. 16 is selected as a target for rule refinement. When selecting a rule for refinement, it is a good practice to have an expert user select from those rules for which a number of cases, especially negative cases, have been accumulated (The system may select them). Then, the description of the selected rule is displayed (in the format shown in FIG. 18) and, at the same time, cases C1–C9 that match the condition statement are displayed in a form an expert can understand easily. Finally, an expert examines the rule description and actual cases to refine the rule, for example, by modifying or dividing the rule or by merging the rule into another rule. This approach is implemented in the "inference system" (Japanese Patent Publication No. 4-130975), applied by the applicant of the present invention, for use with the system proposed in this specification.

It is possible to use explanation-based learning as a deductive learning method (Reference: T. M. Mitchell et al, "Explanation-Based Generalization: A Unifying View", Machine Learning, Vol. 1, No. 1, pp. 47–80, 1986).

In this learning method, a set of rules (called domain theory) that satisfy some specific conditions in the target field are provided. And, when a case is given, the reason why the case satisfies the condition is deductively explained with the use of the domain theory. That is, the learning method allows the system to learn a general rule justifying the given case by means of the structure it provides (that is, a tree structure of rules associated with the field). For example, in this embodiment, if there is a specific rule associated with the fluid temperature, fluid pressure, pipe diameter, and valve material and if that rule is widely accepted in the field, explanation-based learning may be used. For example, in FIG. 19, if the reason why C9 is a negative case is explained, explanation-based learning may be used to learn a rule that justifies C9.

In either case, it is important to fully utilize the result of similarity degree tuning. Although all the information available when the refinement module is started can be used to specialize a rule, most of them cannot be used to know the exact status. Which attribute is important is identified as an importance degree during similarity degree knowledge tuning. This importance degree should be used. That is, only the high importance-degree attributes should be used as the descriptive attributes during inductive learning, or an interview with an expert should be made in order of the importance degree of conditions.

In the above method, desired attributes are selected from all the possible attributes. To make tuning easier, it is a good idea to select, in advance, only the attributes that seem to be related with the object (This reduces the number of variables used in numeric calculation). However, this approach sometimes gives no answer during tuning calculation, meaning that seemingly unrelated attributes are important in the exceptional status description. In this case, it is necessary to add descriptive attributes for re-calculation. Sometimes, the status cannot be represented by simply combining problem input attributes that are entered into the refinement module. In this case, attributes from different viewpoints should be added.

3. Other Embodiments

It is to be understood that the invention is not limited to the embodiment described above and that various changes may be made to it. Therefore, this invention also includes embodiments satisfying any condition described below. For example, the representation of a rule or a case is not limited to that used in the embodiment described above, but may be defined freely. In addition, a rule with which fact data matches or a criterion on which a case corresponding to this rule is based does not always have to satisfy a condition; instead, a rule or a case which has a similar condition may be extracted or the degree of similarity of a condition may be changed at extraction time.

The learning processing module is not always necessary when a system which performs only inference but does not accumulate knowledge is to be built. The expression of "evaluation of an expert" used in this specification means a correct evaluation, or a correct solution. It is not limited to the evaluation of a human expert, but it also includes a judgment made by an external system or a judgment made by a non-expert user.

As described above, an inference method or an inference system according to this invention allows know-how, requiring a delicate judgment which cannot be represented by a rule, to be included into the system, thereby increasing the inference accuracy. It manages cases while maintaining compatibility with already-acquired rules. In addition, it uses cases directly in inference to increase the inference accuracy, eliminating the need to generate approaches from cases. The system also has an advantage of including Case-Based Reasoning (CBR) into a production system.

While a preferred embodiment has been described, variations thereto will occur to those skilled in the art within the scope of the present inventive concepts which are delineated by the following claims.

What is claimed is:

1. An inference method which performs inference using
    a set of rules, each consisting of a conditional statement describing generally a condition necessary for inference and a conclusion statement describing a conclusion corresponding to the condition; and
    a set of cases, each consisting of a conditional statement describing a condition representing a case and a result statement describing a result corresponding to the condition, said inference method comprising:
    a rule extracting process for extracting said rule having a condition which matches given input data;
    a case extracting process for extracting said case corresponding to an extracted rule;
    an evaluating process for evaluating the similarity of said rule and said case to said input data;
    a selecting process for selecting either said rule or said case which has a higher similarity to said input data; and
    an executing process for executing inference based on the conclusion statement of said selected rule or on the result statement of said selected case.

2. An inference method comprising:
    a rule storing process for storing a plurality of rules, each consisting of a conditional statement describing a condition required for inference and a conclusion statement describing a conclusion procedure judged by an expert; and
    a case storing process for storing a plurality of cases, each consisting of a conditional statement describing a condition used in an actual case and a result statement describing a result procedure executed under the condition;
    using a work area for temporarily storing problem data entered via input process and hypothetical data generated during inference process;

further comprising:
    an input process for accepting fact data entered by a user and for storing it into said work area; and
    an inference process for repeating a cycle until a processing stop procedure is executed, in which a rule stored in said rule storing process or a case stored in said case storing process, each corresponding to data stored in said work area, is selected and then the conclusion statement of as elected rule or the result statement of a selected case is executed,
    wherein one cycle of said inference process comprising:
        a rule extraction process for extracting an optimum rule by comparing data stored in said work area with a condition described in the conditional statement of each rule stored in said rule storing process;
    a case extraction process for extracting a case having a conditional statement describing at least partially matching with a condition described in the conditional statement of a rule extracted by said rule extraction process;
        a selection process for comparing the condition described in the conditional statement of the rule extracted from said rule extraction process with the condition described in the conditional statement of the case extracted by said case extraction process and for selecting either the rule or the case which is more similar to fact data entered said input process; and
    an execution process for executing the procedure in the conclusion statement of the rule or in the result statement of the case selected by said selection process.

3. An inference method as claimed in claim 1 or 2 wherein said rule extraction process comprising:
    a matching process for comparing the condition described in the conditional statement of each rule stored in said rule storing process with data stored in said work area and for extracting a rule matching each data; and
    a conflict resolution process for selecting one rule, by using a specified method, when a plurality of rules are extracted by said matching process.

4. An inference method as claimed in claim 1 or 2, further comprising:
    a similarity evaluation knowledge storing process for storing the weights of the attributes constituting said conditions and similarity evaluation knowledge such as a similarity degree function for evaluating similarity between said condition and said fact data, and wherein a similarity degree used in comparison in said selection process is a value satisfying $$sim(P, Q) = \sum_i wt_i(P) \times sim_i(P, Q) \qquad \text{[Formula 9]}$$

where, P is said condition, Q is said fact data, sim is a similarity between condition P and fact data Q, n is the number of attributes for condition P, $wt_i$ (i=1 to n) is a weight stored in said similarity evaluation knowledge storing process, and $sim_i$ ( ) (i=1 to n) is a similarity degree function stored in said similarity evaluation knowledge storing process.

5. An inference method as claimed in claim 4, further comprising:
    an inference history storing process for storing inference processing history for each cycle in said inference process, a re-executing process for re-executing inference processing, after inference processing in said inference process is finished, in said inference process according to inference processing history stored in said inference history storing process, an evaluation input process for accepting expert's evaluation on the inference process and inference result of inference processing performed in said re-executing process, and a case adding process for classifying said inference result into a correct case (positive case) and an incorrect case (negative case) according to the evaluation of an expert entered via said evaluation input process and for adding to said case storing process this evaluation result as well as a case whose conditional statement is said fact data and whose result statement is said inference result, wherein said inference process comprises a history storing process for storing the history of inference processing in each cycle into said inference history storing process.

6. An inference method as claimed in claim 5, further comprising a similarity evaluation knowledge adjusting process for adding and changing, with the use of a specified method, similarity evaluation knowledge stored in said similarity evaluation knowledge storing process according to expert's evaluation entered via said evaluation input process.

7. An inference method as claimed in claim 5, further comprising rule adding process for creating a new rule from each case stored in said case storing process and for adding the created rule to said rule storing process while referencing similarity evaluation knowledge stored in said similarity evaluation knowledge storing process.

8. An inference system which performs inference using a set of rules, each consisting of a conditional statement describing generally a condition necessary for inference and a conclusion statement describing a conclusion corresponding to the condition; and a set of cases, each consisting of a conditional statement describing a condition representing a case and a result statement describing a result corresponding to the condition, said inference system comprising:

a rule extracting means for extracting said rule having a condition which matches given input data;

a case extracting means for extracting said case corresponding to an extracted rule;

an evaluating means for evaluating the similarity of said rule and said case to said input data;

a selecting means for selecting either said rule or said case which has a higher similarity to said input data; and an executing means for executing inference based on the conclusion statement of said selected rule or on the result statement of said selected case.

9. An inference system comprising:

a rule storing means for storing a plurality of rules, each consisting of a conditional statement describing a condition required for inference and a conclusion statement describing a conclusion procedure judged by an expert;

a case storing means for storing a plurality of cases, each consisting of a conditional statement describing a condition used in an actual case and a result statement describing a result procedure executed under the condition;

a work area for temporarily storing problem data entered via input means and hypothetical data generated during inference process;

an input means for accepting fact data entered by a user and for storing it into said work area; and an inference means for repeating a cycle until a processing stop procedure is executed, in which a rule stored in said rule storing means or a case stored in said case storing means, each corresponding to data stored in said work area, is selected and then the conclusion statement of a selected rule or the result statement of a selected case is executed, wherein one cycle of said inference means comprising:

a rule extraction processing module for extracting an optimum rule by comparing data stored in said work area with a condition described in the conditional statement of each rule stored in said rule storing means;

a case extraction processing module for extracting a case having a conditional statement describing at least partially matching with a condition described in the conditional statement of a rule extracted by said rule extraction processing module;

a selection processing module for comparing the condition described in the conditional statement of the rule extracted from said rule extraction processing module with the condition described in the conditional statement of the case extracted by said case extraction processing module and for selecting either the rule or the case which is more similar to fact data entered said input means; and an execution processing module for executing the procedure in the conclusion statement of the rule or in the result statement of the case selected by said selection processing module.

10. An inference system as claimed in claim 8 or 9 wherein said rule extraction processing module comprising:

a matching processing module for comparing the condition described in the conditional statement of each rule stored in said rule storing means with data stored in said work area and for extracting a rule matching each data; and a conflict resolution processing module for selecting one rule, by using a specified method, when a plurality of rules are extracted by said matching processing module.

11. An inference system as claimed in claim 8 or 9, further comprising:

a similarity evaluation knowledge storing means for storing the weights of the attributes constituting said conditions and similarity evaluation knowledge such as a similarity degree function for evaluating similarity between said condition and said fact data, and wherein a similarity degree used in comparison in said selection processing module is a value satisfying $$sim(P, Q) = \sum_i wt_i(P) \times sim_i(P, Q) \qquad \text{[Formula 10]}$$

where, P is said condition, Q is said fact data, sim is a similarity between condition P and fact data Q, n is the number of attributes for condition P, $wt_i$ (i=1 to n) is a weight stored in said similarity evaluation knowledge storing means, and $sim_i$ (i=1 to n) is a similarity degree function stored in said similarity evaluation knowledge storing means.

12. An inference system as claimed in claim 11, further comprising:

an inference history storing means for storing inference processing history for each cycle in said inference means, a re-executing means for re-executing inference processing, after inference processing in said inference means is finished, in said inference means according to inference processing history stored in said inference history storing means, an evaluation input means for accepting expert's evaluation on the inference process and inference result of inference processing performed in said re-executing means, and a case adding means for classifying said inference result into a correct case (positive case) and an incorrect case (negative case) according to the evaluation of an expert entered via said evaluation input means and for adding to said case storing means this evaluation result as well as a case whose conditional statement is said fact data and whose result statement is said inference result, wherein said inference means comprises a history storing processing module for storing the history of inference processing in each cycle into said inference history storing means.

13. An inference system as claimed in claim 12, further comprising a similarity evaluation knowledge adjusting means for adding and changing, with the use of a specified method, similarity evaluation knowledge stored in said similarity evaluation knowledge storing means according to expert's evaluation entered via said evaluation input means.

14. An inference system as claimed in claim 12, further comprising a rule adding means for creating a new rule from each case stored in said case storing means and for adding the created rule to said rule storing means while referencing similarity evaluation knowledge stored in said similarity evaluation knowledge storing means.

* * * * *